US011751109B2

(12) United States Patent
Shrestha et al.

(10) Patent No.: US 11,751,109 B2
(45) Date of Patent: Sep. 5, 2023

(54) SYSTEM INFORMATION BLOCK ACQUISITION FOR WIRELESS NETWORKS

(71) Applicant: QUALCOMM Incorporated, San Diego, CA (US)

(72) Inventors: Bharat Shrestha, San Diego, CA (US); Umesh Phuyal, San Diego, CA (US); Alberto Rico Alvarino, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/317,768

(22) Filed: May 11, 2021

(65) Prior Publication Data

US 2021/0360493 A1 Nov. 18, 2021

Related U.S. Application Data

(60) Provisional application No. 63/024,366, filed on May 13, 2020.

(51) Int. Cl.
*H04W 4/00* (2018.01)
*H04W 36/00* (2009.01)
*H04W 48/16* (2009.01)

(52) U.S. Cl.
CPC ....... *H04W 36/0061* (2013.01); *H04W 48/16* (2013.01)

(58) Field of Classification Search
CPC ......... H04W 36/0061; H04W 36/0083; H04W 36/32; H04W 36/30; H04W 36/18; H04W 36/08; H04W 48/16

USPC .......................................... 370/331; 455/436
See application file for complete search history.

(56) References Cited

U.S. PATENT DOCUMENTS

| | | |
|---|---|---|
| 2017/0331670 A1* | 11/2017 | Parkvall ............... H04J 11/0056 |
| 2018/0167911 A1 | 6/2018 | Kota et al. |
| 2019/0245614 A1 | 8/2019 | Lucky et al. |
| 2021/0099954 A1* | 4/2021 | Agiwal ............. H04W 72/0493 |

FOREIGN PATENT DOCUMENTS

WO WO-2020030715 A1 2/2020

OTHER PUBLICATIONS

International Search Report and Written Opinion—PCT/US2021/032017—ISA/EPO—dated Sep. 23, 2021 (204228WO).

* cited by examiner

*Primary Examiner* — Temica M Beamer
(74) *Attorney, Agent, or Firm* — Holland & Hart LLP

(57) ABSTRACT

Methods, systems, and devices for wireless communications are described. A user equipment (UE) may receive a set of system information blocks (SIBs) common to a set of cells of a non-terrestrial network (NTN), the set of SIBs indicating one or more parameters common to the set of cells for communications with the set of cells. The UE may receive a first SIB associated with a first cell of the set of cells of the NTN, where the first SIB includes cell-specific information indicating a first set of cell-specific parameters for communications with the first cell. The UE may then communicate with the first cell using the first set of cell-specific parameters associated with the cell-specific information of the first cell and at least a first sub-set of parameters of the one or more parameters that are common to the set of cells.

30 Claims, 17 Drawing Sheets

SYSTEM INFORMATION BLOCK ACQUISITION FOR WIRELESS NETWORKS

CROSS REFERENCE

The present application for patent claims the benefit of U.S. Provisional Patent Application No. 63/024,366 by SHRESTHA et al., entitled "SYSTEM INFORMATION ACQUISITION FOR WIRELESS NETWORKS," filed May 13, 2020, assigned to the assignee hereof, and expressly incorporated by reference herein.

FIELD OF TECHNOLOGY

The following relates generally to wireless communications and more specifically to system information block (SIB) acquisition for wireless networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may include one or more non-terrestrial networks (NTNs). In such NTNs, the continuous movement of satellites may result in the continuous movement of cell coverage relative to the UE.

SUMMARY

The described techniques relate to improved methods, systems, devices, and apparatuses that support improvements to system information block (SIB) acquisition. In the context of non-terrestrial networks (NTNs), the continuous movement of satellites may result in the continuous movement of cell coverage. A user equipment (UE) may experience changing cell coverage (e.g., handoffs between cells) due to this continuous movement, even if the UE is stationary. In some cases, the UE may experience a handoff between cells roughly every thirteen seconds due to the movement of satellites of the NTN. These frequent handoffs may cause the UE to acquire a new SIB associated with the new cell each time a handoff is performed. However, the signaling required for frequent SIB acquisition may result in significant resource and signaling overhead, as well as increased power consumption at the UE.

Generally, the described techniques provide for improved communications which may improve SIB acquisition and reduce a quantity of times a UE may acquire a new SIB for a new cell. In some aspects, a UE may acquire a first SIB for a first cell of the NTN, and determine whether the first SIB associated with the first cell is usable for communicating with additional cells of the NTN. In the case that the first SIB associated with the first cell is valid and usable for communications with a second cell, the UE may use the first SIB associated with the first cell for communications with the second cell, thereby avoiding acquisition of a new SIB associated with the second cell. In some cases, the UE may acquire a synchronization signal block (SSB) or a master information block (MIB) associated with the second cell, where the SIB and/or the MIB indicates whether the first SIB associated with the first cell is also usable for communications with the second cell. Additionally or alternatively, the UE may determine whether the first SIB associated with the first cell is still valid or usable for communications with the second cell based on whether the first SIB was received during a validity period associated with the first SIB.

Additional or alternatively, a UE may receive a set of SIBs indicating a set of parameters which are common to a set of cells of an NTN. In this example, upon entering a new cell of the NTN, the UE may acquire cell-specific parameters which are specific to the new cell, and need not acquire the full set of parameters. In cases where the new cell utilizes only the set of parameters which are common to the set of cells, the UE may receive an indication from the new cell indicating that the new cell utilizes the previously-acquired parameters, thereby indicating that the UE need not acquire a new SIB for the new cell.

A method for wireless communications at a UE is described. The method may include receiving a set of SIBs common to a set of cells of an NTN, the set of SIBs indicating one or more parameters common to the set of cells for communications with the set of cells, receiving a first SIB associated with a first cell of the set of cells of the NTN, the first SIB including cell-specific information indicating a first set of cell-specific parameters for communications with the first cell, and communicating with the first cell using the first set of cell-specific parameters associated with the cell-specific information of the first cell and at least a first sub-set of parameters of the one or more parameters that are common to the set of cells.

An apparatus for wireless communications at a UE is described. The apparatus may include a processor, memory coupled with the processor, and instructions stored in the memory. The instructions may be executable by the processor to cause the apparatus to receive a set of SIBs common to a set of cells of an NTN, the set of SIBs indicating one or more parameters common to the set of cells for communications with the set of cells, receive a first SIB associated with a first cell of the set of cells of the NTN, the first SIB including cell-specific information indicating a first set of cell-specific parameters for communications with the first cell, and communicate with the first cell using the first set of cell-specific parameters associated with the cell-specific information of the first cell and at least a first sub-set of parameters of the one or more parameters that are common to the set of cells.

Another apparatus for wireless communications at a UE is described. The apparatus may include means for receiving a set of SIBs common to a set of cells of an NTN, the set of SIBs indicating one or more parameters common to the set of cells for communications with the set of cells, means for receiving a first SIB associated with a first cell of the set of cells of the NTN, the first SIB including cell-specific information indicating a first set of cell-specific parameters for communications with the first cell, and means for communicating with the first cell using the first set of cell-specific parameters associated with the cell-specific information of the first cell and at least a first sub-set of parameters of the one or more parameters that are common to the set of cells.

A non-transitory computer-readable medium storing code for wireless communications at a UE is described. The code may include instructions executable by a processor to receive a set of SIBs common to a set of cells of an NTN, the set of SIBs indicating one or more parameters common to the set of cells for communications with the set of cells, receive a first SIB associated with a first cell of the set of cells of the NTN, the first SIB including cell-specific information indicating a first set of cell-specific parameters for communications with the first cell, and communicate with the first cell using the first set of cell-specific parameters associated with the cell-specific information of the first cell and at least a first sub-set of parameters of the one or more parameters that are common to the set of cells.

Some examples of the method, apparatuses, and non-transitory computer-readable medium described herein may further include operations, features, means, or instructions for identifying a cell-specific parameter of the first set of cell-specific parameters that may be different than a common parameter indicated by the set of SIBs common to the set of cells, the cell-specific information included in the first SIB indicating the cell-specific parameter, where communicating with the first cell may be based on identifying the cell-specific parameter.

Some examples of the method, apparatuses, and non-transitory computer-readable medium described herein may further include operations, features, means, or instructions for identifying a difference between a common parameter indicated by the set of SIBs common to the set of cells and a cell-specific parameter of the first set of cell-specific parameters, an additional common parameter associated with the first cell, or both, the cell-specific information included in the first SIB of the first cell indicating the difference, where communicating with the first cell may be based on identifying the difference.

Some examples of the method, apparatuses, and non-transitory computer-readable medium described herein may further include operations, features, means, or instructions for communicating with a second cell using the one or more parameters indicated by the set of SIBs that may be common to the set of cells.

Some examples of the method, apparatuses, and non-transitory computer-readable medium described herein may further include operations, features, means, or instructions for identifying the set of SIBs may be common to the set of cells based on a geographic coverage area, a tracking area, or both.

Some examples of the method, apparatuses, and non-transitory computer-readable medium described herein may further include operations, features, means, or instructions for receiving a set of non-terrestrial-network-specific parameters, a set of satellite-specific parameters, or both, based on a configured periodicity, or based on receiving an indication to acquire the set of non-terrestrial-network-specific parameters, the set of satellite-specific parameters, or both.

Some examples of the method, apparatuses, and non-transitory computer-readable medium described herein may further include operations, features, means, or instructions for refraining from receiving a set of non-terrestrial-network-specific parameters, a set of satellite-specific parameters, or both, based on receiving indication of a change in the first set of cell-specific parameters or a change in the one or more parameters that may be common to the set of cells.

Some examples of the method, apparatuses, and non-transitory computer-readable medium described herein may further include operations, features, means, or instructions for receiving a configuration message including an indication of a set of downlink resources for receiving SIBs that include the cell-specific information, where receiving the first SIB for the first cell may be based on receiving the configuration message.

Some examples of the method, apparatuses, and non-transitory computer-readable medium described herein may further include operations, features, means, or instructions for receiving, from the first cell, a downlink message including an indication of a change in at least one cell-specific parameter of the first set of cell-specific parameters associated with the first cell or at least one parameter of the one or more parameters that may be common to the set of cells, updating the first SIB associated with the first cell based on receiving the downlink message, and communicating with the first cell based on updating the first SIB.

Some examples of the method, apparatuses, and non-transitory computer-readable medium described herein may further include operations, features, means, or instructions for receiving a second SIB associated with a second cell of the set of cells of the NTN, the second SIB including second cell-specific information indicating a second set of cell-specific parameters for communications with the second cell and communicating with the second cell using the second set of cell-specific parameters associated with the cell-specific information of the first cell and at least a second sub-set of parameters of the one or more parameters that may be common to the set of cells.

Some examples of the method, apparatuses, and non-transitory computer-readable medium described herein may further include operations, features, means, or instructions for receiving an indication of a neighbor cell list associated with the first cell based on receiving the first SIB from the first cell.

Some examples of the method, apparatuses, and non-transitory computer-readable medium described herein may further include operations, features, means, or instructions for receiving an indication of a periodicity, a next update time, or both, associated with an additional SIB associated with at least one cell of the neighbor cell list based on receiving the first SIB.

Some examples of the method, apparatuses, and non-transitory computer-readable medium described herein may further include operations, features, means, or instructions for identifying that an update to the first set of cell-specific parameters associated with the first cell may be available, determining that an expected duration until initiating a cell reselection procedure with a second cell satisfies a threshold, refraining from updating the first set of cell-specific parameters based on determining that the expected duration satisfies the threshold, and performing the cell reselection procedure with the second cell based on determining that the expected duration satisfies the threshold.

Some examples of the method, apparatuses, and non-transitory computer-readable medium described herein may further include operations, features, means, or instructions for receiving the update to the first set of cell-specific parameters associated with the first cell after performing the cell reselection procedure.

Some examples of the method, apparatuses, and non-transitory computer-readable medium described herein may further include operations, features, means, or instructions for identifying that an update to the first set of cell-specific parameters associated with the first cell may be available, refraining from performing an attachment procedure with the first cell based on identifying that the update to the first set of cell-specific parameters for the first cell may be available, and performing an attachment procedure after receiving the update to the first set of cell-specific parameters associated with the first cell based on identifying that the update to the first set of cell-specific parameters for the first cell may be available.

In some examples of the method, apparatuses, and non-transitory computer-readable medium described herein, the one or more parameters common to the set of cells may be used by each cell of the NTN associated with a satellite of the NTN.

In some examples of the method, apparatuses, and non-transitory computer-readable medium described herein, the one or more parameters common to the set of cells may be used by a sub-set of cells of the NTN associated with a satellite of the NTN.

A method for wireless communications at a UE is described. The method may include communicating with a first cell of an NTN using a set of parameters associated with the first cell, receiving a control message associated with a second cell of the NTN, the control message including an indication that the set of parameters associated with the first cell is usable for communicating with the second cell, determining that the set of parameters associated with the first cell is usable for communicating with the second cell based on receiving the indication, and communicating with the second cell of the NTN using the set of parameters based on determining that the set of parameters stored by the UE for the first cell is usable for communicating with the second cell.

An apparatus for wireless communications at a UE is described. The apparatus may include a processor, memory coupled with the processor, and instructions stored in the memory. The instructions may be executable by the processor to cause the apparatus to communicate with a first cell of an NTN using a set of parameters associated with the first cell, receive a control message associated with a second cell of the NTN, the control message including an indication that the set of parameters associated with the first cell is usable for communicating with the second cell, determine that the set of parameters associated with the first cell is usable for communicating with the second cell based on receiving the indication, and communicate with the second cell of the NTN using the set of parameters based on determining that the set of parameters stored by the UE for the first cell is usable for communicating with the second cell.

Another apparatus for wireless communications at a UE is described. The apparatus may include means for communicating with a first cell of an NTN using a set of parameters associated with the first cell, means for receiving a control message associated with a second cell of the NTN, the control message including an indication that the set of parameters associated with the first cell is usable for communicating with the second cell, means for determining that the set of parameters associated with the first cell is usable for communicating with the second cell based on receiving the indication, and means for communicating with the second cell of the NTN using the set of parameters based on determining that the set of parameters stored by the UE for the first cell is usable for communicating with the second cell.

A non-transitory computer-readable medium storing code for wireless communications at a UE is described. The code may include instructions executable by a processor to communicate with a first cell of an NTN using a set of parameters associated with the first cell, receive a control message associated with a second cell of the NTN, the control message including an indication that the set of parameters associated with the first cell is usable for communicating with the second cell, determine that the set of parameters associated with the first cell is usable for communicating with the second cell based on receiving the indication, and communicate with the second cell of the NTN using the set of parameters based on determining that the set of parameters stored by the UE for the first cell is usable for communicating with the second cell.

Some examples of the method, apparatuses, and non-transitory computer-readable medium described herein may further include operations, features, means, or instructions for receiving a second indication of a validity period associated with the set of parameters, where determining that the set of parameters stored by the UE for the first cell may be usable for communicating with the second cell may be based on the validity period.

Some examples of the method, apparatuses, and non-transitory computer-readable medium described herein may further include operations, features, means, or instructions for receiving a second control message associated with a third cell of the NTN and selecting to communicate with the second cell based on the set of parameters stored by the UE being associated with the second cell and not the third cell, where communicating with the second cell may be based on selecting to communicate with the second cell.

Some examples of the method, apparatuses, and non-transitory computer-readable medium described herein may further include operations, features, means, or instructions for receiving a radio resource control (RRC) message or a non-access stratum (NAS) message including one or more sets of SIBs associated with a set of cells of the NTN based on a predicted path of the UE relative to the NTN, where the set of cells includes the first cell and the second cell, where communicating with the first cell may be based on receiving the RRC message or the NAS message.

In some examples of the method, apparatuses, and non-transitory computer-readable medium described herein, determining that the set of parameters stored by the UE for the first cell may be usable for communicating with the second cell may include operations, features, means, or instructions for determining that the set of parameters may be unchanged during a validity period based on receiving the indication.

Some examples of the method, apparatuses, and non-transitory computer-readable medium described herein may further include operations, features, means, or instructions for determining that the set of parameters stored by the UE for the first cell may be not usable for communicating with a third cell of the NTN, receiving one or more SIBs associated with the third cell based on determining that the set of parameters stored by the UE for the first cell may be not usable for communicating with the third cell, and communicating with the third cell based on receiving the one or more SIBs.

Some examples of the method, apparatuses, and non-transitory computer-readable medium described herein may further include operations, features, means, or instructions for receiving one or more SIBs associated with the first cell that include the set of parameters for communicating with the first cell of the NTN, where communicating with the first cell may be based on receiving the one or more SIBs and determining that the first cell belongs to a set of cells based on a second indication of a set of physical cell identifiers associated with the set of parameters.

Some examples of the method, apparatuses, and non-transitory computer-readable medium described herein may further include operations, features, means, or instructions for receiving a downlink message including a neighbor cell list associated with the first cell and one or more parameters associated with at least one cell of the neighbor cell list, where communicating with the first cell may be based on receiving the downlink message.

Some examples of the method, apparatuses, and non-transitory computer-readable medium described herein may further include operations, features, means, or instructions for selecting the second cell as part of an intra-frequency cell reselection procedure or an inter-frequency cell reselection procedure with the second cell, where communicating with the second cell may be based on selecting the second cell and refraining from updating the neighbor cell list associated with the second cell based on selecting the second cell as part of the intra-frequency cell reselection procedure or the inter-frequency cell reselection procedure.

Some examples of the method, apparatuses, and non-transitory computer-readable medium described herein may further include operations, features, means, or instructions for selecting the second cell as part of an intra-frequency cell reselection procedure with the second cell, where communicating with the second cell may be based on selecting the second cell and updating the neighbor cell list associated with the second cell based on selecting the second cell as part of the intra-frequency cell reselection procedure.

Some examples of the method, apparatuses, and non-transitory computer-readable medium described herein may further include operations, features, means, or instructions for selecting the second cell as part of an inter-frequency cell reselection procedure with the second cell, where communicating with the second cell may be based on selecting the second cell and updating the neighbor cell list associated with the second cell based on selecting the second cell as part of the inter-frequency cell reselection procedure.

DETAILED DESCRIPTION

Figure 1:
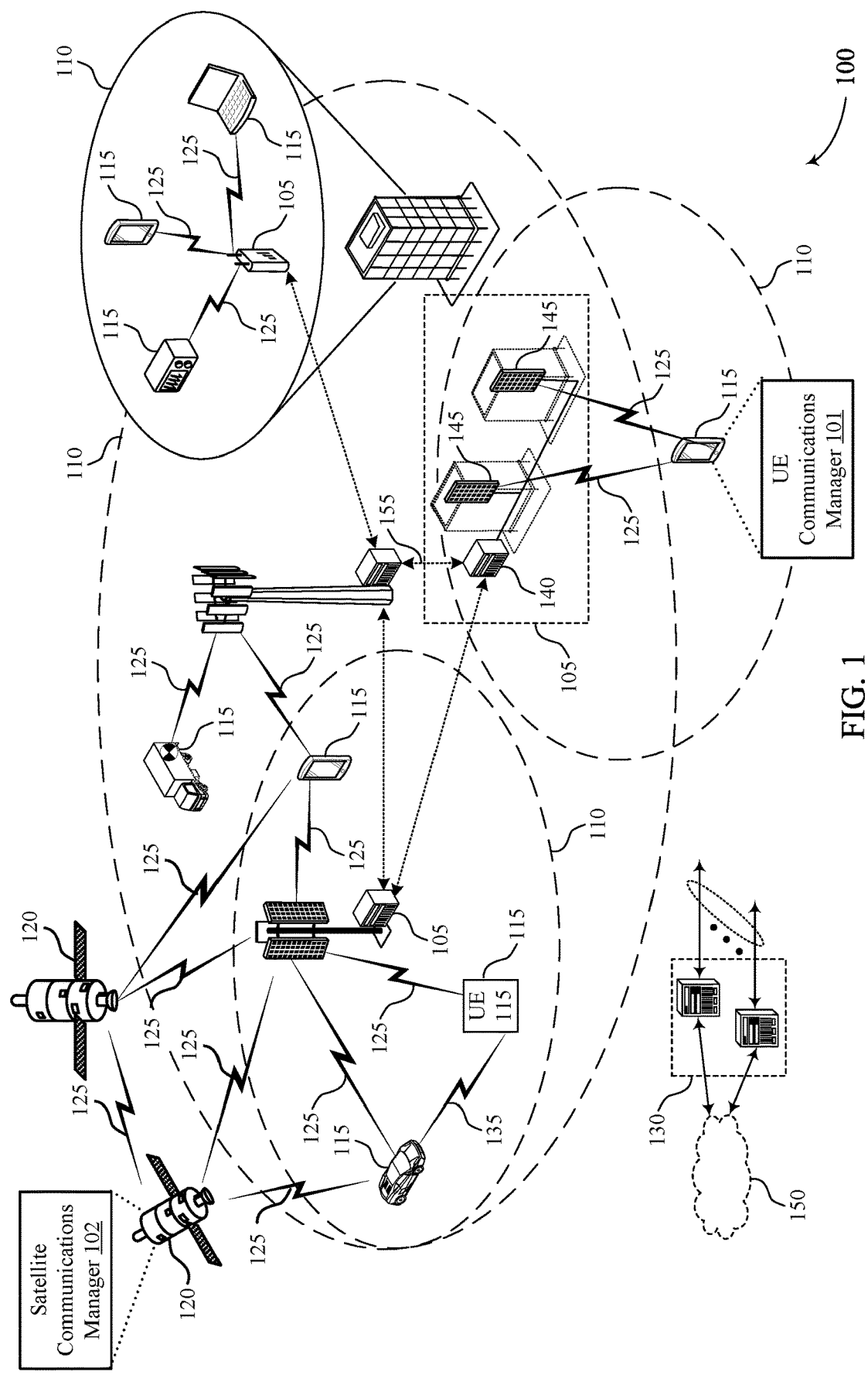
FIG. 1 illustrates an example of a wireless communications system that supports system information block (SIB) acquisition for wireless networks in accordance with aspects of the present disclosure.

Some wireless communications systems may include one or more non-terrestrial networks (NTNs). In some NTNs, the continuous movement of satellites may result in the continuous movement of cell coverage. A user equipment (UE) may experience changing cell coverage (e.g., handoffs between cells) due to this continuous movement, even if the UE is stationary. In some cases, the UE may experience a handoff between cells roughly every thirteen seconds due to the movement of satellites of the NTN. These frequent handoffs may cause the UE to acquire a new system information block (SIB) associated with the new cell each time a handoff is performed (e.g., every thirteen seconds). However, the signaling required for frequent SIB acquisition may result in significant resource and signaling overhead, as well as increased power consumption at the UE.

To address the issues associated with frequent SIB acquisition in the context of wireless communications systems (e.g., NTNs), techniques are described for reducing the quantity of times UE may acquire a SIB for a new cell. The UE may acquire a first SIB for a first cell of the NTN, and determine whether the first SIB associated with the first cell is usable for communicating with additional cells of the NTN. In the case that the first SIB associated with the first cell is valid and usable for communications with a second cell, the UE may use the first SIB associated with the first cell for communications with the second cell, thereby avoiding acquisition of a new SIB associated with the second cell. Using SIBs in such a manner may create a need for signaling whether such a SIB is valid for the second cell. In some cases, the UE may acquire a synchronization signal block (SSB) or a master information block (MIB) associated with the second cell, where the SIB and/or the MIB indicates whether the first SIB associated with the first cell is also usable for communications with the second cell. Additionally or alternatively, the UE may determine whether the first SIB associated with the first cell is still valid or usable for communications with the second cell based on whether the first SIB was received during a validity period associated with the first SIB.

Additional or alternatively, a UE may receive a set of SIBs indicating a set of parameters which are common to a set of cells of an NTN. In this example, upon entering a new cell of the NTN, the UE may acquire cell-specific parameters which are specific to the new cell, and need not acquire the full set of SIBs. In cases where the new cell utilizes only the set of parameters which are common to the set of cells, the UE may receive an indication from the new cell indicating that the new cell utilizes the previously-acquired SIBs, thereby indicating that the UE need not acquire a new SIB for the new cell.

Aspects of the disclosure are initially described in the context of wireless communications systems. Aspects of the disclosure are also illustrated by example process flow diagrams. Aspects of the disclosure are further illustrated by and described with reference to apparatus diagrams, system diagrams, and flowcharts that relate to change of tracking area code for wireless networks.

FIG. 1 illustrates an example of a wireless communications system 100 that supports SIB acquisition for wireless networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. Each of the UEs 115 may include a UE communications manager 101 configured to facilitate wireless communications between the respective UE 115 and other wireless devices (e.g., other UEs 115, base stations 105, satellites 120).

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). The satellite 120 may include a satellite communications manager 102 configured to facilitate wireless communications between the satellite 120 and other wireless devices (e.g., UEs 115, base stations 105, other satellites 120). Satellite 120 may be any suitable type of communication satellite configured to relay communications between different end nodes in a wireless communications system. Satellite 120 may be an example of a space satellite, a balloon, a dirigible, an airplane, a drone, an unmanned aerial vehicle, and/or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. For example, a satellite 120 may support a first cell and a second cell, where a first beam of the satellite 120 supports the first cell and a second beam of the satellite 120 supports the second cell. The satellite 120 may be any distance away from the surface of the earth.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

The UEs 115, the base stations 105, and/or satellites 120 may support communications to enable improvements to SIB acquisition for wireless networks (e.g., NTNs). In some aspects, a UE 115 may acquire a first SIB for a first cell of the NTN, and determine whether the first SIB associated with the first cell is usable for communicating with additional cells of the NTN. In cases where the first SIB associated with the first cell is valid and usable for communications with a second cell, the UE 115 may use the first SIB associated with the first cell for communications with the second cell, thereby avoiding acquisition of a new SIB associated with the second cell. Using SIBs in such a manner may create a need for signaling whether such a SIB is valid for the second cell. In some cases, the UE 115 may acquire an SSB or a MIB associated with the second cell, where the SIB and/or the MIB indicates that the first SIB associated with the first cell is usable for communications with the second cell. Additionally, the UE 115 may determine whether the first SIB associated with the first cell is still valid or usable for communications with the second cell based on whether the first SIB was received during a validity period associated with the SIB.

Additional or alternatively, the UE 115 may receive a set of SIBs indicating a set of parameters which are common to a set of cells of an NTN. In this example, upon entering a new cell of the NTN, the UE 115 may acquire cell-specific parameters which are specific to the new cell, and need not acquire the full set of SIBs. In cases where the new cell utilizes only the set of parameters which are common to the set of cells, the UE 115 may receive an indication from the new cell indicating that the new cell utilizes the previously-acquired parameters, thereby indicating that the UE 115 need not acquire a new SIB for the new cell. In this regard, the signaling overhead and power consumption of the UE 115 associated with SIB acquisition may be significantly reduced.

The techniques described herein may improve SIB acquisition in the wireless communications system 100. In particular, the techniques described herein may reduce a quantity of times that the UEs 115 may acquire a SIB for a new cell. These techniques may reduce resource and signaling overhead associated with SIB acquisition within the wireless communications system 100, and may additionally reduce power consumption at the UEs 115 and the satellites 120.

Figure 2:
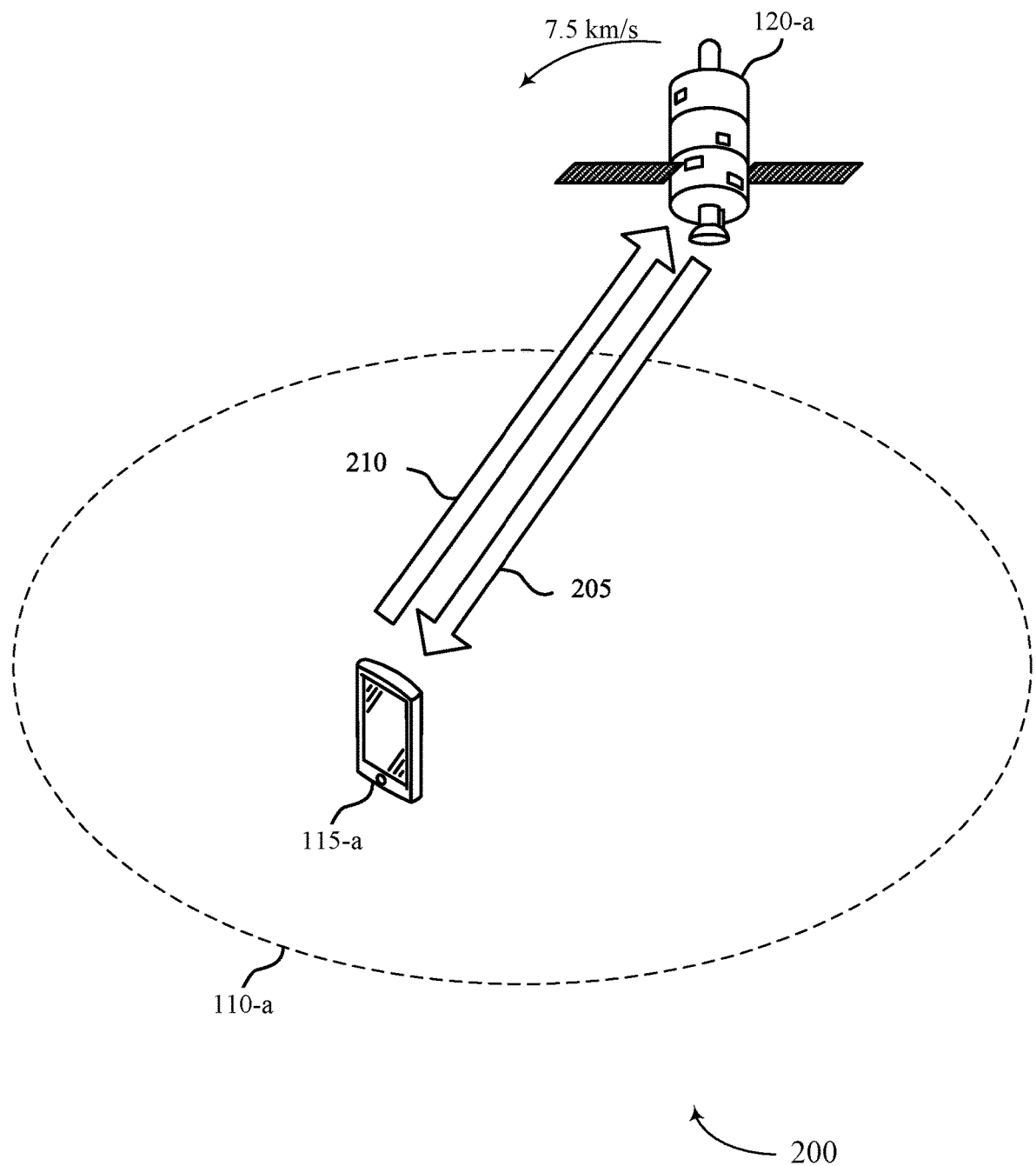
FIG. 2 illustrates an example of a wireless communications system that supports SIB acquisition for wireless networks in accordance with aspects of the present disclosure.

FIG. 2 illustrates an example of a wireless communications system 200 that supports SIB acquisition for wireless networks in accordance with aspects of the present disclosure. Wireless communications system 200 may include a UE 115-a, and a satellite 120-a (e.g., which in some cases may also be referred to as a base station 105), which may be examples of base stations 105, UEs 115, and satellites 120 as described with reference to FIG. 1. The satellite 120-a may serve a coverage area 110-a in cases of an NTN.

The wireless communications system 200 may support communications between the UE 115-a and the satellite 120-a. For example, UE 115-a may transmit an uplink transmission 210 to the satellite 120-a. Conversely, by way of another example, the satellite 120-a may transmit a downlink transmission 205 to the UE 115-a. The satellite 120-a may be in an orbit, such as low earth orbit, medium earth orbit, geostationary earth orbit, or other non-geostationary earth orbit. In any of these examples, the satellite 120-a may be many thousands of kilometers from Earth, and therefore may be thousands of kilometers from the UE 115-a. Each transmission (e.g., downlink transmission 205, uplink transmission 210) between the satellite 120-a and the UE 115-a may therefore travel from Earth the distance to the satellite 120-a and back to Earth.

In some aspects, the coverage area 110-a of the satellite 120-a may be significantly larger than coverage areas associated with terrestrial base stations (e.g., base station 105-a). In this regard, the coverage area 110-a may serve multiple terrestrial tracking areas. The coverage area 110-a of the satellite may be sub-divided up into a plurality of cells which serve the terrestrial tracking areas of the coverage area 110-a. For the purposes of the present disclosure, the term "terrestrial tracking area" may be used to refer to a region defined by selected terrestrial boundaries. In this regard, a terrestrial tracking area may refer to a defined region on Earth defined by a selected geofenced boundary. The boundaries of a terrestrial tracking area may be independent of one or more boundaries of one or more cells of an NTN, in some cases.

The satellite 120-a may move or travel relative to fixed positions on Earth (e.g., move relative to terrestrial tracking areas). For example, when the satellite 120-a is in a low-earth orbit, the satellite 120-a may be between 600 km to 2000 km from Earth and travelling at a rate of 7.5 km/s. Therefore, the satellite 120-a and coverage area 110-a served by the satellite 120-a may move relative to Earth over time. Accordingly, UE 115-a may be located within and served by varying cells making up the coverage area 110-a of the satellite over time as the satellite 120-a moves relative to the UE 115-a. For example, in cases where the UE 115-a remains in a fixed location within a given terrestrial tracking area, the UE 115-a may experience changing cell coverage as the satellite 120-a, coverage area 110-a, and cells of the coverage area 110-a move relative to the UE 115-a over time. For instance, due to the movement of the satellite 120-a over time, the UE 115-a may experience changing cell coverage (e.g., handoffs between cells) approximately every thirteen seconds.

In some wireless communications systems, a UE 115-a within an NTN may acquire a new SIB associated with the new cell every time the UE 115-a experiences changing cell coverage (e.g., handoffs between cells) within the NTN. For example, in some wireless communications systems, a UE 115-a may acquire a new SIB associated with a new cell serving the UE 115-a approximately every thirteen seconds. These frequent handoffs (and therefore frequent SIB acquisitions) may result in significant resource and signaling overhead, as well as increased power consumption at the UE 115-a.

Accordingly, the wireless communications system 200 may be configured to support transmissions between the UE 115-a and the satellite 120-a in order to address these issues. In particular, the UE 115-a may acquire a first SIB associated with a first cell of an NTN supported by the satellite 120-a, and determine whether the first SIB associated with the first cell is valid and usable for communicating with a second cell of the NTN. In cases where the first SIB associated with the first cell is usable for communicating with the second cell, the UE 115-a may refrain from acquiring a new SIB associated with the second cell, and may instead use the first SIB associated with the first cell to communicate with the second cell.

Additionally or alternatively, the UE 115-a may acquire one or more SIBs associated with a set of cells of the NTN. The one or more SIBs may include an indication of one or more parameters common to the set of cells communications with the set of cells (e.g., "common SIBs"). In such an example, the UE 115-a may receive a first SIB from a first cell, where the first SIB includes an indication of a first set of cell-specific parameters for communicating with the first cell (e.g., "cell-specific SIB"). Additionally, or alternatively, the one or more SIBs may include an indication of one or more parameters common to the NTN (e.g., NTN-specific parameters) and/or parameters common to individual satellites of the NTN (e.g., satellite-specific parameters). In some cases, the first SIB may include an indication of differences from the set of parameters common to the set of cells which are to be used for communicating with the first cell. Additionally or alternatively, the first SIB may include an indication that the first cell utilizes the set of parameters common to the set of cells for communications with the first cell. By acquiring the set of parameters common to the set of cells, and subsequently acquiring cell-specific parameters from each respective cell, signaling overhead associated with SIB acquisition may be reduced, thereby reducing power consumption of the UE 115-a and the satellite 120-a.

Figure 3:
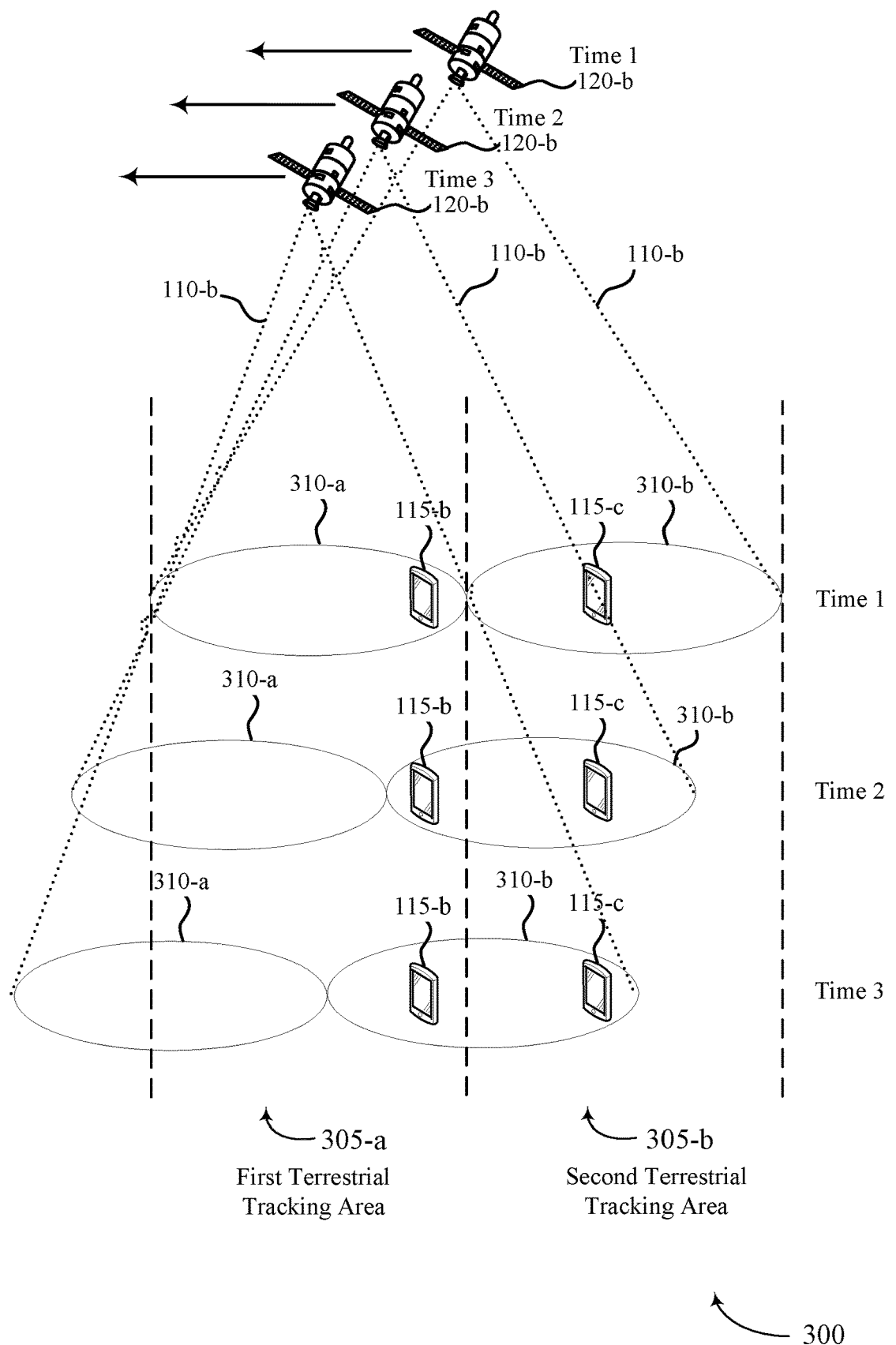
FIG. 3 illustrates an example of a wireless communications system that supports SIB acquisition for wireless networks in accordance with aspects of the present disclosure.

FIG. 3 illustrates an example of a wireless communications system 300 that supports SIB acquisition for wireless networks in accordance with aspects of the present disclosure. In some examples, wireless communications system 300 may implement aspects of wireless communications system 100 and/or wireless communications system 200. Generally, FIG. 3 illustrates one or more aspects of the disclosure which improve SIB acquisition for wireless networks (e.g., NTNs).

The wireless communications system 300 may include a satellite 120-b which serves a first UE 115-b and a second UE 115-c. In some aspects, a coverage area 110-b of the satellite 120-b may include a set of cells which make up the coverage area 110-b. For example, the satellite 120-b may include a first cell 310-a and a second cell 310-b. For example, a first beam of the satellite 120-b may support the first cell 310-a, and a second beam of the satellite 120-b may support the second cell 310-b. The coverage area 110-b of the satellite 120-b may include any number of cells 310 which span any number of terrestrial tracking areas 305, and that the first cell 310-a and the second cell 310-b are illustrated in FIG. 3 solely for illustrative purposes. For example, as shown in FIG. 3, the coverage area 110-b of the satellite 120-b may span a first terrestrial tracking area 305-a and a second terrestrial tracking area 305-b. In some cases, a cell 310 supported by the satellite 120-b may serve the first terrestrial tracking area 305-a, the second terrestrial tracking area 305-b, or both.

In some aspects, the satellite 120-b may move relative to the Earth over time. Accordingly, the satellite 120-b may also move relative to the UEs 115-b and 115-c over time. For example, as shown in FIG. 3, the satellite 120-b may be located at a first position at Time 1, at a second position at Time 2, and a third position at Time 3. In this example, Time 2 is subsequent to Time 1, and Time 3 is subsequent to Time 2 such that the satellite 120-b is illustrated as moving from right to left across the page over time. Additionally, the coverage area 110-b served by the satellite 120-b may also move relative to the Earth and the UEs 115-b and 115-c over time as the satellite 120-b moves relative to the Earth. For example, at Time 1, the coverage area 110-b may be positioned such that the first cell 310-a serves the first UE 115-b, and the second cell serves the second UE 115-b. At Time 2, the coverage area 110-b may have shifted relative to Earth (and the UEs 115-b and 115-c) such that the second cell 310-b serves both the first UE 115-b and the second UE 115-c In this regard, in the case of NTNs including a satellite 120-b which move relative to Earth, the first UE 115-b, the second UE 115-c, or both, may experience changing cell coverage as the satellite 120-b moves relative to Earth. For example, as illustrated in FIG. 3, the first UE 115-b and the second UE 115-c may remain stationary over time within the first terrestrial tracking area 305-a and the second terrestrial tracking area 305-b, respectively. The second UE 115-c may be disposed within the second cell 310-b such that the second cell 310-b serves the second UE 115-b at Time 1, Time 2, and Time 3. Comparatively, the first UE 115-b may be disposed within the first cell 310-a at Time 2, and may be disposed within the second cell 310-b at Time 2 and Time 3. In this regard, the first UE 115-b may experience changing cell coverage over time despite remaining stationary within the first terrestrial tracking area 305-a due to the mobility of the satellite 120-b and corresponding coverage area 110-b. However, the first UE 115-c, the second UE 115-c, or both, may not be stationary in all scenarios. For example, the first UE 115-b may move from the first terrestrial tracking area 305-a to the second terrestrial tracking area 305-b.

The changing cell coverage experienced by the first UE 115-b illustrated in FIG. 3 may cause the first UE 115-b and the satellite 120-b to perform a handoff procedure (e.g., cell reselection procedure) from the first cell 310-a to the second cell 310-b between Time 1 and Time 2 as the first UE 115-b experiences changing cell coverage. In some cases, the first UE 115-b and the second UE 115-c may experience changing cell coverage (e.g., perform a handoff procedure or cell reselection procedure) approximately every thirteen seconds.

One challenge that may be associated with the changing cell coverage experienced by the first UE 115-b is related to the acquisition of a new SIB each time the first UE 115-b experiences changing cell coverage. In particular, between Time 1 and Time 2, the first UE 115-b may experience changing cell coverage between the first cell 310-a and the second cell 310-b. In some cases, the first UE 115-b may perform a handoff procedure (e.g., cell reselection procedure) between the first cell 310-a and the second cell 310-b between Time 1 and Time 2. The UE 115-b may communicate with the first cell 310-a at Time 1 based on a first SIB (e.g., a first set of parameters indicated by the first SIB). In some cases, at Time 2, the UE 115-b may acquire a second SIB associated with the second cell 310-b in order to communicate with the second cell 310-b using the second SIB (e.g., second set of parameters indicated by the second SIB). However, it may be undesirable for the first UE 115-b to acquire new SIB each time the first UE 115-b experiences changing cell coverage. In particular, in the context of NTNs, the UEs 115-b and 115-c may experience frequent changing cell coverage due to the mobility of the satellite 120-b. This may result in frequent SIB acquisition, thereby resulting in resource and signaling overhead, as well as increased power consumption at the UEs 115-b and 115-c.

Accordingly, in some aspects of the disclosure, wireless communications system 300 may support communications between the satellite 120-b and the UEs 115-b and 115-c that enable improved SIB acquisition and potentially reduce the quantity of times the UEs 115-b and 115-c may acquire a SIB for a new cell. For example, in some aspects, the UE 115-b may receive, from the satellite 120-b, one or more SIBs associated with one or more cells of an NTN supported by the satellite 120-b. For example, at or before Time 1, the UE 115-*b* may receive one or more SIBs associated with the first cell 310-*a* supported by the satellite 120-*c*, where the one or more SIBs associated with the first cell 310-*a* include a set of parameters for communicating with the first cell 310-*a*.

By way of another example, in some cases, the UE 115-*b* may receive one or more sets of SIBs associated with a set of cells 310 of the NTN. The one or more sets of SIBs may include an indication of one or more sets of parameters for communicating with the set of cells 310. In some aspects, the one or more sets of SIBs may be received via a radio resource control (RRC) message, an NAS message, or any combination thereof. For example, the satellite 120-*b* may transmit an RRC message, an NAS message, or both, where the RRC message and/or NAS message includes the one or more sets of SIBs associated with the set of cells 310. In some cases, the set of cells 310 may include every cell 310 supported by the satellite 120-*b*, every cell 310 of the NTN, or both. In this regard, the set of parameters indicated in the sets of SIBs may be used by each cell 310 of the NTN associated with the satellite 120-*b*. In additional or alternative cases, the set of cells 310 may include a sub-set of cells 310 supported by the satellite 120-*b*, a sub-set of cells 310 of the NTN, or both. In this regard, the set of parameters indicated in the sets of SIBs may be used by a sub-set of cells 310 of the NTN associated with the satellite 120-*b*.

In some cases, the satellite 120-*b* may transmit the one or more sets of SIBs based on a predicted path of the UE 115-*b* relative to the NTN. For example, the satellite 120-*b* may move relative to Earth such that the geographic coverage area (and therefore the cells 310 making up the geographic coverage area) move relative to Earth. In this regard, the UE 115-*b* may experience changing cell coverage based on a predicted path of the UE 115-*b* relative to the NTN (or a predicted path of the NTN relative to the UE 115-*b*), as shown in FIG. 3. Accordingly, the satellite 120-*b* may be configured to determine a predicted path of the UE 115-*b* relative to the NTN (or a predicted path of the NTN relative to the UE 115-*b*). Determining the predicted path of the UE 115-*b* and/or the NTN relative to one another may include determining one or more cells 310 of the NTN along the predicted path (e.g., one or more cells 310 expected to serve the UE 115-*b* over time). For instance, a predicted path of the UE 115-*b* relative to the NTN may include at least the first cell 310-*a* and the second cell 310-*b*. The satellite 120-*b* may determine the predicted path based on characteristics of the UE 115-*b* (e.g., position, speed, heading, or trajectory of the UE 115-*b*), characteristics of the satellite 120-*b* (e.g., position, speed, heading, or trajectory of the satellite 120-*b*), or any combination thereof.

In some aspects, the UE 115-*b* may receive an indication of a validity period associated with the set of parameters of the first cell 310-*a*. The indication of the validity period may be indicated in a SIB, SSB, MIB, or any combination thereof. In this regard, the UE 115-*b* may receive an indication of a validity period associated with the first SIB associated with the first cell 310-*a*. The indication of the validity period may be preconfigured by the UE 115-*b*, indicated via signaling from the satellite 120-*b*, or any combination thereof. In some cases, the indication of the validity period associated with the set of parameters of the first cell 310-*a* and/or the validity period associated with the first SIB of the first cell 310-*a* may be indicated in the SIBs received by the UE 115-*b*.

In some cases, the validity period associated with the set of parameters of the first cell 310-*a* may include a time interval or duration for which the set of parameters are valid for communications with the first cell 310-*a*. The validity period may be used to indicate whether a SIB stored by the UE 115-*b* is usable for another cell supported by the NTN. Additionally or alternatively, the indication of the validity period may include an indication that the set of parameters of the first cell 310-*a* will not be changed or updated during the validity period. For example, the UE 115-*b* may receive a first SIB associated with the first cell 310-*a*. The first SIB may include an indication of a set of parameters for communicating with the first cell 310-*a*, and an indication that the set of parameters will be valid and/or remain unchanged for one hour from the time that the first SIB was transmitted (e.g., validity period of one hour).

As shown in FIG. 3, the UE 115-*b* may communicate with the satellite 120-*b* via the first cell 310-*a* of the NTN at Time 1. In some aspects, the UE 115-*b* may communicate with the first cell 310-*a* based on the one or more SIBs received from the satellite 120-*b*. In this regard, the UE 115-*b* may communicate with the first cell 310-*a* based on the set of parameters associated with the first cell 310-*a*. In cases where the UE 115-*b* receives a set of SIBs associated with a set of cells 310, where the set of SIBs include an indication of one or more sets of parameters for communicating with the set of cells 310, the UE 115-*b* may determine that the first cell 310-*a* belongs to the set of cells 310 based on a set of physical cell identifiers (PIDs) associated with the set of parameters, a PID associated with the first cell 310-*a*, or any combination thereof. In some aspects, the set of PIDs and/or the PID associated with the first cell 310-*a* may be indicated in the set of SIBs. Accordingly, the UE 115-*b* may be able to determine that the set of parameters indicated in the set of SIBs are usable for the first cell 310-*a* based on the set of PIDs indicated in the set of SIBs.

In some aspects, the UE 115-*b* may receive, from the first cell 310-*a*, a downlink message from the satellite 120-*c*, where the downlink message includes an indication of a neighbor cell list associated with the UE 115-*b*, the first cell 310-*a*, or both. For example, the UE 115-*b* may receive and store a neighbor cell list associated with the UE 115-*b*, where the neighbor cell list includes one or more neighbor cells associated with the first cell 310-*a*. Additionally or alternatively, the downlink message may include an indication of one or more parameters associated with at least one cell 310 of the neighbor cell list. For example, the downlink message may include one or more SIBs associated with at least one cell 310 of the neighbor cell list. In some implementations, a UE 115 may receive an indication of a periodicity and/or next update time for receiving/acquiring updated SIBs for cells 310 of the neighbor cell list. In some cases, the first SIB for the first cell 305-*a* may indicate the periodicity and/or next update times for receiving/acquiring SIBs for the cells of the neighbor cell list. In some cases, the UE 115-*b* may determine whether or not to update the neighbor cell list associated with (and stored by) the UE 115-*b* as the UE 115-*b* experiences changing cell coverage. Aspects of the neighbor cell list are discussed in further detail herein.

The UE 115-*b* may additionally or alternatively identify that an update to the set of parameters associated with the first cell 310-*a* is available (e.g., system information (SI) update). In some cases, the UE 115-*b* may determine that the update to the set of parameters associated with the first cell 310-*a* is available based on signaling received from the satellite 120-*b*. For example, the satellite 120-*b* may transmit, to the UE 115-*b*, a downlink message (e.g., control message) including an indication that the update is available. In additional or alternative aspects, the UE 115-*b* may determine that the update is available based on determining an expiration of the validity period associated with the set of parameters associated with the first cell 310-*a*.

In some aspects, the UE 115-*b* may determine whether or not to perform the update (e.g., SI update) to the set of parameters associated with, or to initiate a random access procedure with, the first cell 310-*a*. The UE 115-*b* may determine whether or not to perform the update to the set of parameters associated with, or to initiate a random access procedure with, the first cell 310-*a* based on an expected duration until a cell reselection procedure (e.g., expected duration until a cell reselection procedure with the second cell 310-*b*), an expected duration that the UE 115-*b* is expected to remain within the first cell 310-*a*, a position (e.g., location) of the UE 115-*b* within the NTN, whether a random access procedure has been initiated or completed, or any combination thereof.

For example, in some aspects, the UE 115-*b* may identify that an update to the set of parameters associated with the first cell 310-*a* is available. The UE 115-*b* may determine that an expected duration until initiating a cell reselection procedure with the second cell 310-*b* satisfies a threshold. For instance, the UE 115-*b* may determine that the expected duration until initiating a cell reselection procedure with the second cell 310-*b* is less than a threshold duration. In this example, the UE 115-*b* may refrain from updating the set of parameters based on determining that the expected duration satisfies the threshold, and may perform the cell reselection procedure with the second cell 310-*b* based on determining that the expected duration satisfies the threshold.

In some aspects, the UE 115-*b* may receive a control message associated with the second cell 310-*b* of the NTN supported by the satellite 120-*b*. For example, as the UE 115-*b* experiences changing cell coverage between Time 1 and Time 2, the UE 115-*b* may receive a control message from the second cell 310-*b*. The control message may include, but is not limited to, an SSB message, a MIB message, or any combination thereof. For example, at Time 2, the UE 115-*b* may receive a control message from the second cell 310-*b*. The control message may include an indication that the set of parameters associated with the first cell 310-*a* is usable for communicating with the second cell 310-*b*. In this regard, the control message may include an indication that the first SIB associated with the first cell 310-*a* is usable for communications with the second cell 310-*b*. Accordingly, the UE 115-*b* may determine that the set of parameters stored by the UE 115-*d* for communications with the first cell 310-*a* (e.g., the first SIB associated with the first cell 310-*a*) is usable for communicating with the second cell 310-*b* based on the control message.

The indication that the first set of parameters associated with the first cell 310-*a* are usable for communications with the second cell 310-*b* may include an indication that the second cell 310-*b* utilizes a default set of parameters. In some cases, the indication at the first SIB associated with the first cell 310-*a* is usable for communications with the second cell 310-*b* may be indicated in a bit field of an SSB message, a MIB message, or both.

In some cases, the indication that the set of parameters associated with the first cell 310-*a* is usable for communicating with the second cell may include a validity period associated with the set of parameters. In this regard, UE 115-*b* may determine that the set of parameters associated with the first cell 310-*a* are usable for the second cell 310-*b* based on the validity period associated with the set of parameters. For example, the UE 115-*b* may receive the control message (e.g., SSB, MIB) from the second cell 310-*b*, the control message including an indication of a validity period associated with the set of parameters. In this example, the UE 115-*b* may determine that the set of parameters associated with the first cell 310-*a* are usable for communicating with the second cell 310-*b* based on determining that the set of parameters are unchanged during the validity period. In some cases, the UE 115-*b* may determine that the set of parameters are unchanged during the validity period based on the indication in the configuration message. Conversely, by way of another example, the UE 115-*b* may determine that the set of parameters associated with the first cell 310-*a* are not usable for communicating with the second cell 310-*b* based on determining that the set of parameters were received outside of the validity period.

In some cases, the NTN may exhibit overlapping cell coverage. For example, at Time 2, the UE 115-*b* may be positioned within geographical coverage areas of the second cell 310-*b* and a third cell (not shown), respectively. In this regard, the UE 115-*b* may experience overlapping cell coverage, and may be able to select whether to communicate with the second cell 310-*b*, the third cell, or both. In such an example, the UE 115-*b* may additionally receive a control message associated with the third cell of the NTN supported by the satellite 120-*b*.

Continuing with the same example, the UE 115-*b* may determine (e.g., select) whether to communicate with the second cell 310-*b* or the third cell. The UE 115-*b* may be configured to determine (e.g., select) whether to communicate with the second cell 310-*b* or the third cell based on any characteristics or parameters associated with the second cell 310-*b* and/or third cell including signal-to-noise (SNR) values, signal-to-interference-plus-noise ratio (SINR) values, reference signal received power (RSRP) values, reference signal received quality (RSRQ) values, or any combination thereof. Additionally or alternatively, the UE 115-*b* may determine to communicate with (e.g., perform an attachment procedure or cell resection procedure with) the second cell 310-*b* or the third cell based on whether the set of parameters associated with the first cell 310-*a* are usable for communicating with the second cell 310-*b*, the third cell, or both. For instance, the UE 115-*b* may determine that the set of parameters associated with the first cell 310-*a* (e.g., the SIB(s) associated with the first cell 310-*a*) are usable for communications with the second cell 310-*b*, but are not usable for communications with the third cell. In this example, the UE 115-*b* may select to communicate with the second cell 310-*b* based on determining that the set of parameters associated with the first cell 310-*a* (e.g., the SIB(s) associated with the first cell 310-*a*) are usable by (e.g., associated with) the second cell 310-*b* and not the third cell. Conversely, by way of another example, the UE 115-*b* may determine that the set of parameters associated with the first cell 310-*a* are usable for communications with the third cell, but are not usable for communications with the second cell 310-*b*, and may therefore select to communicate with the third cell. In some cases, neither or both of the second cell 310-*b* or third cell may be associated with the set of parameters associated with the first cell 310-*a*.

In some cases, the UE 115-*b* may determine that the set of parameters associated with the first cell 310-*a* are usable by the second cell 310-*b* and not the third cell. However, in some cases, the UE 115-*b* may additionally identify that an update to the set of parameters associated with the first cell 310-*a* (and therefore the set of parameters associated with the second cell 310-*b*) is available. In this example, the UE 115-*b* may select the third cell to avoid performing the update associated with the set of parameters. For example, upon identifying that an update to the set of parameters associated with the first cell 310-*a* (and therefore the set of parameters associated with the second cell 310-*b*) is available, the UE 115-*b* may refrain from performing an attachment procedure with the second cell 310-*b* based on identifying that the update to the set of parameters for the first cell 310-*a* (and second cell 310-*b*) is available. In this example, the UE 115-*b* may perform a cell reselection procedure with a third cell based on identifying that the update to the set of parameters for the first cell 310-*a* (and second cell 310-*b*) is available.

In some cases, the UE 115-*b* selects to communicate with the second cell 310-*b* (rather than the third cell), as shown in FIG. 3. Upon selecting to communicate with the second cell 310-*b*, the UE 115-*b* may determine whether the set of parameters associated with the first cell 310-*a* (e.g., the SIB(s) associated with the first cell 310-*a*) are usable for the second cell 310-*b*. In some cases, as discussed previously herein, this determination may additionally or alternatively be performed when evaluating whether to select the second cell 310-*b* or the third cell.

In some cases, the UE 115-*b* may determine whether the set of parameters associated with the first cell 310-*a* are usable for communications with the second cell 310-*b* based on signaling received from the first cell 310-*a*, the second cell 310-*b*, or both. For example, as noted previously herein, the UE 115-*b* may receive a control message (e.g., SSB, MIB) from the second cell 310-*b*, where the control message includes an indication that the second cell 310-*b* utilizes the set of parameters associated with the first cell 310-*a*, a default set of parameters, or both. By way of another example, the control message received from the second cell 310-*b* may include an indication of a validity period associated with the set of parameters. In this example, the UE 115-*b* may determine that the set of parameters associated with the first cell 310-*a* are usable for communicating with the second cell 310-*b* based on determining that the set of parameters are unchanged during the validity period. Conversely, by way of another example, the UE 115-*b* may determine that the set of parameters associated with the first cell 310-*a* are not usable for communicating with the second cell 310-*b* based on determining that the set of parameters were received outside of the validity period.

In cases where the UE 115-*b* determines that the set of parameters associated with the first cell 310-*a* are usable for communicating with the second cell 310-*b*, the UE 115-*b* may communicate with the second cell 310-*b* using the set of parameters associated with the first cell 310-*a*. The UE 115-*b* may communicate with the second cell 310-*b* based on performing a reselection procedure with the second cell 310-*b*, determining that the first set of parameters associated with the first cell 310-*a* are usable for communicating with the second cell 310-*b*, or any combination thereof.

Conversely, in cases where the UE 115-*b* determines that the set of parameters associated with the first cell 310-*a* are not usable for communicating with the second cell 310-*b*, the UE 115-*b* may receive (e.g., acquire) one or more SIBs associated with the second cell 310-*b*. The one or more SIBs associated with the second cell 310-*b* may include a set of parameters for communicating with the second cell 310-*b*. In some aspects, the UE 115-*b* may receive the one or more SIBs associated with the second cell 310-*b* based on determining that the set of parameters associated with the first cell 310-*a* are not usable for communicating with the second cell 310-*b*. Subsequently, the UE 115-*b* may communicate with the second cell 310-*b* based on the one or more SIBs associated with the second cell 310-*b* (e.g., based on the set of parameters associated with the second cell 310-*b*).

In some aspects, the UE 115-*b* may determine whether or not to update the neighbor cell list associated with the UE 115-*b*, the first cell 310-*a*, or both. In some cases, the UE 115-*b* may determine whether to update the neighbor cell list based on communicating with the second cell 310-*b*, performing a reselection procedure with the second cell 310-*b*, or any combination thereof. In some cases, the UE 115-*b* may determine whether or not to update the neighbor cell list based on whether the UE 115-*b* selected the second cell 310-*b* as part of an inter-frequency cell reselection procedure or an intra-frequency cell reselection procedure.

For example, the UE 115-*b* may receive a downlink message including an indication of a neighbor cell list associated with the UE 115-*b*, the first cell 310-*a*, the second cell 310-*b*, or any combination thereof, and one or more parameters (e.g., one or more SIBs) associated with at least one cell of the neighbor cell list. In some cases, the UE 115-*b* may select the second cell 310-*b* as part of an intra-frequency cell reselection procedure or an inter-frequency cell reselection procedure, and may refrain from updating the neighbor cell list based on selecting the second cell 310-*b* as part of the intra-frequency cell reselection procedure or the inter-frequency cell reselection procedure.

By way of another example, the UE 115-*b* may select the second cell 310-*b* as part of an intra-frequency cell reselection procedure, and may update the neighbor cell list associated with the UE 115-*b*, the first cell 310-*a*, the second cell 310-*b*, or any combination thereof, based on selecting the second cell 310-*b* as part of the intra-frequency cell reselection procedure. Conversely, in some cases, the UE 115-*b* may select the second cell 310-*b* as part of an inter-frequency cell reselection procedure, and may update the neighbor cell list associated with the UE 115-*b*, the first cell 310-*a*, the second cell 310-*b*, or any combination thereof, based on selecting the second cell 310-*b* as part of the inter-frequency cell reselection procedure.

In some cases, the UE 115-*b* may refrain from updating the neighbor cell list, and may acquire a new neighbor cell list after powering off, entering a low power mode, going out of service, or any combination thereof. For example, in some cases, after powering off or going out of service, the UE 115-*b* may perform a cell selection procedure (as opposed to a cell reselection procedure) and may acquire the neighbor cell list associated with the cell with which the UE 115-*b* performs the cell selection procedure.

In additional or alternative aspects, the satellite 120-*b* and the UE 115-*b* illustrated in FIG. 3 may address issues associated with SIB acquisition by supporting communications which enable the UE 115-*b* to acquire a set of SIBs which are usable for communicating with a set of cells 310 of the NTN, and subsequently acquiring only cell-specific parameters associated with a new cell upon entering the new cell. By using SIBs in such a manner, the UE 115-*b* need not acquire a full set of SIBs each time it enters a new cell, and may instead rely on previously-acquired SIBs.

For example, at or before Time 1, the UE 115-*b* may receive a set of SIBs common to a set of cells of an NTN supported by the satellite 120-*b* (e.g., common SIBs). In some aspects, the set of SIBs may include an indication of one or more parameters common to the set of cells for communications with the set of cells. In some cases, the set of cells may include every cell supported by the satellite 120-*b*, every cell of the NTN, or both. Additionally or alternatively, the set of cells may include a sub-set of cells supported by the satellite 120-*b*, a sub-set of cells of the NTN, or both. In some cases, the set of cells may include the first cell 310-*a* and the second cell 310-*b*. The UE 115-*b* may identify which cells 305 are associated with the common SIBs based on geographic coverage areas, tracking areas (e.g., TACs), and the like. The set of SIBs may include an indication of a set of PIDs associated with the set of cells. For example, in cases where the set of cells includes the first cell 310-*a* and the second cell 310-*b*, the set of SIBs may include a first PID associated with the first cell 310-*a* and a second PID associated with the second cell 310-*b*.

In some cases, the UE 115-*b* may receive a configuration message including an indication of a set of downlink resources for receiving SIBs which include the cell-specific information associated with set of cells. In this regard, the configuration message may include an indication of a set of downlink resources which the UE 115-*b* is to monitor for receiving SIBs from cells of the NTN which include cell-specific information. Accordingly, the UE 115-*b* may monitor the set of downlink resources based on receiving the configuration message.

In some aspects, the UE 115-*b* may receive one or more SIBs associated with the first cell 310-*a*, where the one or more SIBs include cell-specific information indicating a first set of cell-specific parameters for communicating with the first cell 310-*a*. For example, the UE 115-*b* may receive a first SIB associated with the first cell 310-*a*, where the first SIB includes cell-specific information indicating a first set of cell-specific parameters for communications with the first cell 310-*a*. In some cases, the UE 115-*b* may receive the first SIB associated with the first cell 310-*a* based on receiving the configuration message including the indication of downlink resources for receiving SIBs that include cell-specific information. In some aspects, the first SIB associated with the first cell 310-*a* may include a first PID associated with the first cell. In this regard, the UE 115-*b* may determine whether the first cell 310-*a* is included within the set of cells associated with the set of parameters common to the set of cells based on the set of PIDs associated with the set of cells, the first PID associated with the first cell 310-*a*, or any combination thereof.

In other cases, the UE 115 may receive a set of NTN-specific parameters (e.g., parameters for communicating with the NTN) and/or a set of satellite-specific parameters (e.g., parameters for communicating with a specific satellite 120) based on a configured periodicity, or based on receiving an indication to acquire the respective parameters. Conversely, in some cases, the UE 115-*b* may refrain from acquiring/receiving NTN-specific parameters and/or satellite-specific parameters base don receiving an indication of a change in a cell-specific and/or common parameters associated with the first cell 305-*a* and/or other cells 305 of the wireless communications system 200.

In some aspects, the UE 115-*b* may receive, from the first cell 310-*a*, an indication of a neighbor cell list associated with the first cell 310-*a*. For example, the first SIB including the first set of cell-specific parameters associated with the first cell 310-*a* may include an indication of a neighbor cell list associated with the first cell 310-*a*. Additionally or alternatively, the first SIB including the first set of cell-specific parameters associated with the first cell 310-*a* may include an indication of one or more parameters associated with at least one cell of the neighbor cell list. For example, the first SIB including the first set of cell-specific parameters associated with the first cell 310-*a* may include one or more SIBs associated with at least one cell of the neighbor cell list.

The UE 115-*b* may identify differences, if any, between the set of parameters common to the set of cells and the first set of cell-specific parameters associated with the first cell 310-*a*, which are indicated in the cell-specific information associated with the first cell 310-*a*. For example, the UE 115-*b* may identify a cell-specific parameter of the first set of cell-specific parameters associated with the first cell 310-*a* that is different than a parameter of the set of parameters common to the set of cells. By way of another example, the UE 115-*b* may identify a difference between a parameter of the set of parameters common to the set of cells and a cell-specific parameter of the first set of cell-specific parameters associated with the first cell 310-*a*.

In some aspects, the UE 115-*b* may communicate with the first cell 310-*a* supported by the satellite 120-*b* based on the one or more parameters common to the set of cells, the first set of cell-specific parameters associated with the first cell 310-*a*, or any combination thereof. For example, the UE 115-*b* may communicate with the first cell 310-*a* based on at least a first sub-set of parameters of the one or more parameters common to the set of cells and the first set of cell-specific parameters associated with the first cell 310-*a*. Additionally, the UE 115-*b* may communicate with the first cell 310-*a* based on identifying differences between the set of parameters common to the set of cells and the first set of cell-specific parameters associated with the first cell 310-*a*. In some cases, the first cell 310-*a* may not utilize any cell-specific parameters. In such a case, the UE 115-*b* may communicate with the first cell 310-*a* using only the set of parameters common to the set of cells.

In some aspects, the UE 115-*b* may identify that an update to the first set of cell-specific parameters associated with the first cell 310-*a* (e.g., SI update) is available. In some cases, the UE 115-*b* may determine that the update to the set of parameters associated with the first cell 310-*a* is available based on signaling received from the satellite 120-*b*. For example, the satellite 120-*b* may transmit, to the UE 115-*b*, a downlink message (e.g., control message) including an indication that the update is available. The downlink message may include an indication of an update or change to at least one cell-specific parameter of the first set of cell-specific parameters associated with the first cell 310-*a*. In additional or alternative aspects, the UE 115-*b* may determine that the update is available based on determining an expiration of the validity period associated with the set of parameters associated with the first cell 310-*a*.

In some aspects, the UE 115-*b* may determine whether or not to perform the update (e.g., SI update) to the at least one cell-specific parameter of the first set of cell-specific parameters associated with, or to initiate a random access procedure with, the first cell 310-*a*. The UE 115-*b* may determine whether or not to perform the update to the first set of cell-specific parameters associated with, or to initiate a random access procedure with, the first cell 310-*a* based on an expected duration until a cell reselection procedure (e.g., expected duration until a cell reselection procedure with the second cell 310-*b*), an expected duration that the UE 115-*b* is expected to remain within the first cell 310-*a*, a position (e.g., location) of the UE 115-*b* within the NTN, whether a random access procedure has been initiated or completed, or any combination thereof.

For example, in some cases, the UE 115-*b* may update the first SIB associated with the first cell 310-*a* based on receiving the downlink message including the indication of the change to at least one cell-specific parameter of the first set of cell-specific parameters associated with the first cell 310-*a*. The UE 115-*b* may then communicate with the first cell 310-*a* based on updating the first SIB associated with the first cell 310-*a*.

By way of another example, in some aspects, the UE 115-*b* may identify that an update to the first set of cell-specific parameters associated with the first cell 310-*a* is available. The UE 115-*b* may determine that an expected duration until initiating a cell reselection procedure with the second cell 310-*b* satisfies a threshold. For instance, the UE 115-*b* may determine that the expected duration until initiating a cell reselection procedure with the second cell 310-*b* is less than a threshold duration. In this example, the UE 115-*b* may refrain from updating the first set of cell-specific parameters associated with the first cell 310-*a* based on determining that the expected duration satisfies the threshold, and may perform the cell reselection procedure with the second cell 310-*b* based on determining that the expected duration satisfies the threshold.

Subsequently, the UE 115-*b* may experience changing cell coverage between Time 1 and Time 2. In this regard, the UE 115-*b* may receive one or more SIBs associated with the second cell 310-*b* of the NTN supported by the satellite 120-*b*. The one or more SIBs associated with the second cell 310-*b* may include cell-specific information indicating a set of cell-specific parameters for communicating with the second cell 310-*b*. For example, at Time 2, the UE 115-*b* may receive a second SIB associated with the second cell 310-*b*, where the second SIB includes cell-specific information associated with the second cell 310-*b* which indicates a second set of cell-specific parameters for communications with the second cell 310-*b*. In some aspects, the UE 115-*b* may receive the second SIB from the second cell 310-*b* based on receiving the configuration message including the indication of the set of downlink resources for receiving SIBs including cell-specific information. In some cases, the UE 115-*b* may identify differences, if any, between the set of parameters common to the set of cells and the second set of cell-specific parameters associated with the second cell 310-*b*. In some aspects, the second SIB associated with the second cell 310-*b* may include a second PID associated with the second cell 310-*b*. In this regard, the UE 115-*b* may determine whether the second cell 310-*b* is included within the set of cells associated with the set of parameters common to the set of cells based on the set of PIDs associated with the set of cells, the second PID associated with the second cell 310-*b*, or any combination thereof.

In some aspects, the second SIB including the second set of cell-specific parameters associated with the second cell 310-*b* may include an indication of a neighbor cell list associated with the second cell 310-*b*. Additionally or alternatively, the second SIB including the second set of cell-specific parameters associated with the second cell 310-*b* may include an indication of one or more parameters (e.g., one or more SIBs) associated with at least one cell of the neighbor cell list. Accordingly, the UE 115-*b* may update the neighbor cell list stored by the UE 115-*b* based on the indication of the neighbor cell list associated with the second cell 310-*b*.

The UE 115-*b* may communicate with the second cell 310-*b* based on the one or more parameters common to the set of cells, the second set of cell-specific parameters associated with the second cell 310-*b*, or any combination thereof. For example, the UE 115-*b* may communicate with the second cell 310-*b* based on at least a second sub-set of parameters of the one or more parameters common to the set of cells and the second set of cell-specific parameters associated with the second cell 310-*b*. Additionally, the UE 115-*b* may communicate with the second cell 310-*b* based on identifying differences between the parameters common to the set of cells and the second set of cell-specific parameters associated with the second cell 310-*b*. In some cases, the second cell 310-*b* may not utilize any cell-specific parameters. In such a case, the UE 115-*b* may communicate with the second cell 310-*b* using only the set of parameters common to the set of cells.

The techniques described herein may improve SIB acquisition in the wireless communications system 100, 200, and 300. In particular, the techniques described herein may reduce a quantity of times that the UEs 115 may acquire a SIB for a new cell. For example, in cases where the UE 115-*b* determines that a first SIB associated with the first cell 310-*a* is valid and usable for communications with the second cell 310-*b*, the UE 115-*b* may use the first SIB associated with the first cell 310-*a* for communications with the second cell 310-*b*, thereby avoiding acquisition of a new SIB associated with the second cell 310-*b*. By way of another example, the UE 115-*b* may receive a set of SIBs indicating a set of parameters which are common to a set of cells of an NTN. In this example, upon entering the first cell 310-*a* or the second cell 310-*pb* of the NTN, the UE 115-*b* may acquire cell-specific parameters which are specific to the respective cell (e.g., cell-specific parameters associated with the first cell 310-*a*, cell-specific parameters associated with the second cell 310-*b*), and need not acquire the full set of SIBs. These techniques may reduce resource and signaling overhead associated with SIB acquisition within the wireless communications system 300, and may additionally reduce power consumption at the satellite 120-*b* and the UE 115-*b*.

Figure 4:
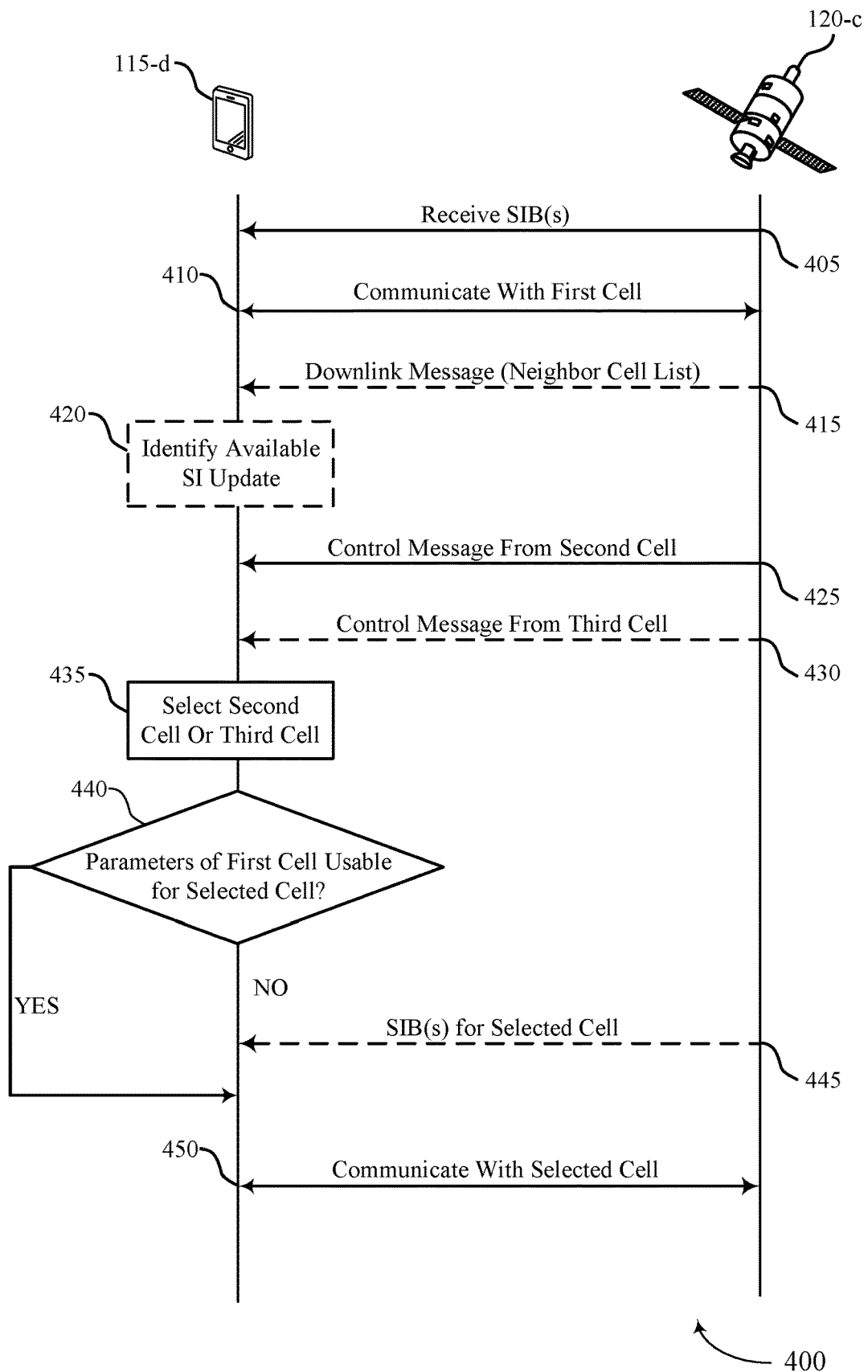
FIG. 4 illustrates an example of a process flow that supports SIB acquisition for wireless networks in accordance with aspects of the present disclosure.

FIG. 4 illustrates an example of a process flow 400 that supports SIB acquisition for wireless networks in accordance with aspects of the present disclosure. In some examples, process flow 400 may implement aspects of wireless communications system 100, 200, 300, or any combination thereof. For example, process flow 400 may illustrate improved SIB acquisition techniques, as described with reference to FIGS. 1-3, among other aspects.

The process flow 400 may include a satellite 120-*c* and a UE 115-*d*, which may be examples of a gNB (or base station 105) and a UE 115 as described with reference to FIGS. 1-3. In the following description of the process flow 400, the operations between the satellite 120-*c* and the UE 115-*d* may be performed in a different order than the example order shown, or the operations performed by the satellite 120-*c* and the UE 115-*d* may be performed in different orders or at different times. Some operations may also be omitted from the process flow 400, and other operations may be added to the process flow 400. In some examples, the operations illustrated in process flow 400 may be performed by hardware (e.g., including circuitry, processing blocks, logic components, and other components), code (e.g., software or firmware) executed by a processor, or any combination thereof.

In the example of FIG. 4, the satellite 120-*c* and the UE 115-*d* may be in communication with each other via an NTN. In particular, the satellite 120-*c* and the UE 115-*d* may be in communication with each other via one or more cells of an NTN supported by the satellite 120-*c*. The process flow 400 may support improved SIB acquisition within the wireless communications system 100, 200, 300, or any combination thereof (e.g., improved SIB acquisition within an NTN).

At 405, the UE 115-*d* may receive (e.g., acquire) one or more SIBs associated with one or more cells of an NTN supported by the satellite 120-*c*. The one or more SIBs may include an indication of a set of parameters for communicating with the at least one cell of the NTN. For example, in some cases, the UE 115-*d* may receive a first SIB associated with a first cell supported by the satellite 120-*c*, where the first SIB associated with the first cell includes a set of parameters for communicating with the first cell.

By way of another example, in some cases, the UE 115-*d* may receive one or more sets of SIBs associated with a set of cells of the NTN. The one or more sets of SIBs may include an indication of one or more sets of parameters for communicating with the set of cells. In some aspects, the one or more sets of SIBs may be received via an RRC message, an NAS message, or any combination thereof. For example, the satellite 120-*c* may transmit an RRC message, an NAS message, or both, where the RRC message and/or NAS message includes the one or more sets of SIBs associated with the set of cells.

In some cases, the satellite 120-*c* may transmit the one or more sets of SIBs based on a predicted path of the UE 115-*d* relative to the NTN. For example, the satellite 120-*c* may move relative to Earth such that the geographic coverage area (and therefore the cells making up the geographic coverage area) move relative to Earth. In this regard, the UE 115-*d* may experience changing cell coverage based on a predicted path of the UE 115-*d* relative to the NTN (or a predicted path of the NTN relative to the UE 115-*d*). Accordingly, the satellite 120-*c* may be configured to determine a predicted path of the UE 115-*d* relative to the NTN (or a predicted path of the NTN relative to the UE 115-*d*). Determining the predicted path of the UE 115-*d* and/or the NTN relative to one another may include determining one or more cells of the NTN along the predicted path (e.g., one or more cells expected to serve the UE 115-*d* over time). The satellite 120-*c* may determine the predicted path based on a position, speed, or heading/trajectory of the UE 115-*d*, a position, speed, or heading/trajectory of the satellite 120-*c*, or any combination thereof. In such an example, the satellite 120-*c* may transmit the one or more sets of SIBs at 405 based on the determined expected path of the UE 115-*d* relative to the NTN (or a determined predicted path of the NTN relative to the UE 115-*d*).

In some aspects, the UE 115-*d* may receive an indication of a validity period associated with the set of parameters of the first cell. The indication of the validity period may be indicated in the one or more SIBs received at 405, an SSB, a MIB, or any combination thereof. In this regard, the UE 115-*d* may receive an indication of a validity period associated with the first SIB associated with the first. In some cases, the validity period associated with the set of parameters of the first cell may include a time interval or duration for which the set of parameters are valid for communications with the first cell. Additionally or alternatively, the indication of the validity period may include an indication that the set of parameters of the first cell will not be changed or updated during the validity period. For example, the UE 115-*d* may receive a first SIB associated with the first cell. The first SIB may include an indication of a set of parameters for communicating with the first cell, and an indication that the set of parameters will be valid and/or remain unchanged for one hour from the time that the first SIB was transmitted (e.g., validity period of one hour).

At 410, the UE 115-*d* may communicate with the first cell supported by the satellite 120-*c* (e.g., first cell of the NTN). In some aspects, the UE 115-*d* may communicate with the first cell based on the one or more SIBs (e.g., one or more sets of SIBs) received at 405. In this regard, the UE 115-*d* may communicate with the first cell using the set of parameters associated with communications with the first cell, as indicated in the one or more SIBs received at 405.

At 415, the UE 115-*d* may receive a downlink message from the satellite 120-*c*, where the downlink message includes an indication of a neighbor cell list associated with the first cell. Additionally or alternatively, the downlink message may include an indication of one or more parameters associated with at least one cell of the neighbor cell list. For example, the downlink message may include one or more SIBs associated with at least one cell of the neighbor cell list. In some aspects, communicating with the first cell at 410 may be based on receiving the downlink message including the neighbor cell list at 410.

At 420, the UE 115-*d* may identify that an update to the set of parameters associated with the first cell is available (e.g., SI update). In some cases, the UE 115-*d* may determine that the update to the set of parameters associated with the first cell is available based on signaling received from the satellite 120-*c*. For example, the satellite 120-*c* may transmit, to the UE 115-*d*, a control message including an indication that the update is available. In additional or alternative aspects, the UE 115-*d* may determine that the update is available based on determining an expiration of a validity period associated with the first SIB associated with the first cell.

In some aspects, the UE 115-*d* may determine whether or not to perform the update (e.g., SI update) to the set of parameters associated with, or to initiate a random access procedure with, the first cell. The UE 115-*d* may determine whether or not to perform the update to the set of parameters associated with, or to initiate a random access procedure with, the first cell based on an expected duration until a cell reselection procedure (e.g., expected duration until a cell reselection procedure with a second cell), an expected duration that the UE 115-*d* is expected to remain within the first cell, a position (e.g., location) of the UE 115-*d* within the NTN, whether a random access procedure has been initiated or completed, or any combination thereof.

For example, in some aspects, the UE 115-*d* may identify that an update to the set of parameters associated with the first cell is available. The UE 115-*d* may determine that an expected duration until initiating a cell reselection procedure with the second cell satisfies a threshold. For instance, the UE 115-*d* may determine that the expected duration until initiating a cell reselection procedure with the second cell is less than a threshold duration. In this example, the UE 115-*d* may refrain from updating the set of parameters based on determining that the expected duration satisfies the threshold.

At 425, the UE 115-*d* may receive a control message associated with a second cell of the NTN supported by the satellite 120-*c*. The UE 115-*b* may receive the control message from the second cell based on changing cell coverage experienced by the UE 115-*d*. The control message may include, but is not limited to, an SSB message, a MIB message, or any combination thereof. The control message may be received from the second cell, and may include an indication that the set of parameters associated with the first cell is usable for communicating with the second cell. In this regard, the control message associated with the second cell may include an indication that the first SIB message associated with the first cell is usable for communications with the second cell. The indication that the set of parameters associated with the first cell is usable for communicating with the second cell may include a validity period associated with the set of parameters, an indication that the second cell uses the set of parameters associated with the first cell, an indication that the second cell uses a default set of parameters, or any combination thereof. In some cases, the indication may be indicated in a bit field of the control message (e.g., SSB message, MIB message).

At 430, the UE 115-*d* may receive a control message associated with a third cell of the NTN supported by the satellite 120-*c*. The control message may include, but is not limited to, an SSB message, a MIB message, or any combination thereof. In some aspects, the UE 115-*d* may receive the control message from the second cell at 425 and may receive the control message from the third cell at 430 based on the UE 115-*d* being positioned within geographical coverage areas of the second cell and the third cell. For example, due to the movement of the NTN, the UE 115-*d* may experience changing cell coverage in which the NTN moves such that the UE 115-*d* goes from being positioned within the first cell to being positioned within both the second cell and the third cell. In this example, the UE 115-*d* may be simultaneously supported by the second cell and the third cell.

At 435, the UE 115-*d* may determine (e.g., select) whether to communicate with the second cell or the third cell. The UE 115-*d* may be configured to determine (e.g., select) whether to communicate with the second cell or the third cell based on any characteristics or parameters associated with the second cell and/or third cell including SNR values, SINR values, RSRP values, RSRQ values, or any combination thereof.

Additionally or alternatively, the UE 115-*d* may determine to communicate with (e.g., perform an attachment procedure or cell reselection procedure with) the second cell or the third cell based on whether the set of parameters associated with the first cell are usable for communicating with the second cell, the third cell, or both. For example, the UE 115-*d* may determine that the set of parameters associated with the first cell (e.g., the first SIB associated with the first cell) are usable for communications with the second cell, but are not usable for communications with the third cell. In this example, the UE 115-*d* may select to communicate with the second cell based on determining that the set of parameters associated with the first cell (e.g., the first SIB associated with the first cell) are usable by (e.g., associated with) the second cell and not the third cell.

By way of another example, the UE 115-*d* may determine that the set of parameters associated with the first cell (e.g., the first SIB associated with the first cell) are usable for communications with the third cell, but are not usable for communications with the second cell, and may therefore select to communicate with the third cell. In some cases, neither or both of the second cell or third cell may be associated with the set of parameters associated with the first cell, in which case the UE 115-*c* may select which cell to communicate with based on additional or alternative characteristics (e.g., SNR, SINR, RSRP, RSRQ).

At 440, the UE 115-*d* may determine whether the set of parameters associated with the first cell (e.g., the first SIB associated with the first cell) are usable for the cell selected at 435. In some cases, as discussed previously herein, this determination at 440 may additionally or alternatively be performed at step 435 when evaluating whether to select the second cell or the third cell. In some cases, the UE 115-*d* may determine whether the set of parameters associated with the with the first cell are usable for the selected cell based on the validity period associated with the set of parameters. For example, the UE 115-*d* may receive the control message (e.g., SSB, MIB) from the selected cell (e.g., second cell or third cell), the control message including an indication of a validity period associated with the set of parameters. In this example, the UE 115-*d* may determine that the set of parameters associated with the first cell are usable for communicating with the selected cell based on determining that the set of parameters are unchanged during the validity period. Conversely, by way of another example, the UE 115-*d* may determine that the set of parameters associated with the first cell are not usable for communicating with the selected cell based on determining that the set of parameters were received outside of the validity period.

If the UE 115-*d* determines that the set of parameters associated with the first cell are usable for the selected cell (e.g., step 440 is "YES"), the process flow 400 may proceed to 450. Conversely, if the UE 115-*d* determines that the set of parameters associated with the first cell are not usable for the selected cell (e.g., step 440 is "NO"), the process flow 400 may proceed to 445.

At 445, the UE 115-*d* may receive (e.g., acquire) one or more SIBs associated with the selected cell. The one or more SIBs associated with the selected cell may include a set of parameters for communicating with the selected cell. In some aspects, the UE 115-*d* may receive the one or more SIBs associated with the selected cell based on determining that the set of parameters associated with the first cell are not usable for communicating with the selected cell at 440 (e.g., based on determining "NO" at 440).

At 450, the UE 115-*d* may communicate with the selected cell. In some aspects, the UE 115-*d* may communicate with the selected cell based on performing a reselection procedure with the selected cell. In some aspects, communicating with the second cell at 450 may be based on selecting to communicate with the selected cell at 435. Moreover, communicating with the selected cell at 450 may be based on determining whether the first set of parameters associated with the first cell are usable for communicating with the selected cell at 440. For example, in cases where the UE 115-*d* determines that the set of parameters associated with the first cell (e.g., the first SIB associated with the first cell) are usable for communications with the selected cell (e.g., step 440 is "YES"), the UE 115-*d* may communicate with the selected cell at 450 based on (e.g., using) the set of parameters associated with the first cell. By way of another example, in cases where the UE 115-*d* determines that the set of parameters associated with the first cell are not usable for communications with the selected cell (e.g., step 440 is "NO"), the UE 115-*d* may communicate with the selected cell at 450 based on the one or more SIBs associated with the selected cell which were received at 445.

In some aspects, the UE 115-*d* may determine whether or not to update the neighbor cell list associated with the first cell. In some cases, the UE 115-*b* may determine whether to update the neighbor cell list based on communicating with the second cell, performing a reselection procedure with the second cell, or any combination thereof. In some cases, the UE 115-*d* may determine whether or not to update the neighbor cell list based on whether the UE 115-*d* selected the second cell based as part of an inter-frequency cell reselection procedure or an intra-frequency cell reselection procedure, as described previously herein.

The techniques of process flow 400 may improve SIB acquisition in the wireless communications system 100, 200, and 300. In particular, the techniques of process flow 400 may reduce a quantity of times that the UE 115-*d* may acquire a SIB for a new cell. Accordingly, these techniques may reduce resource and signaling overhead associated with SIB acquisition within the wireless communications system 100, 200, or 300, and may additionally reduce power consumption at the UE 115-*d* and the satellite 120-*c*.

Figure 5:
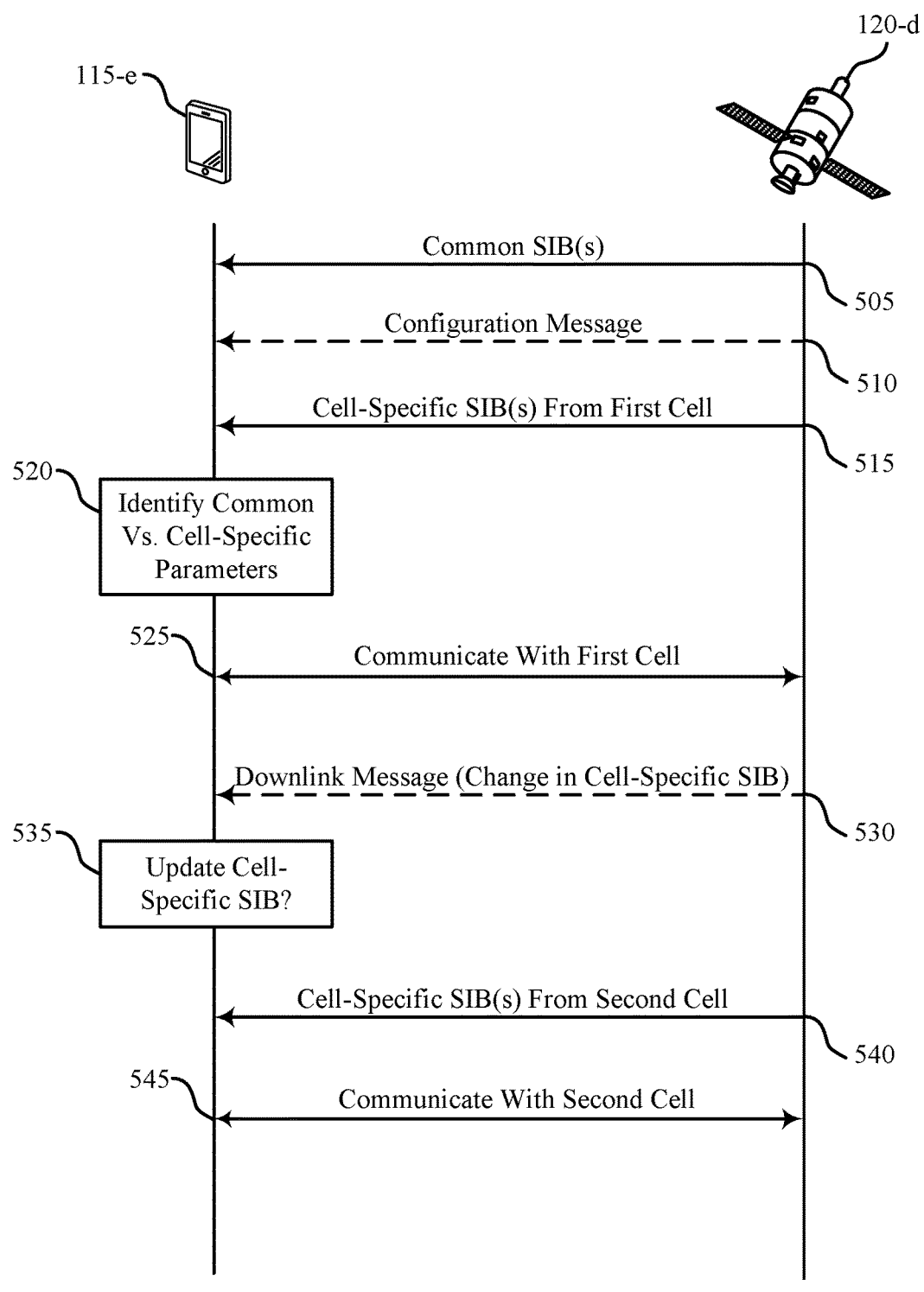
FIG. 5 illustrates an example of a process flow that supports SIB acquisition for wireless networks in accordance with aspects of the present disclosure.

FIG. 5 illustrates an example of a process flow 500 that supports SIB acquisition for wireless networks in accordance with aspects of the present disclosure. In some examples, process flow 500 may implement aspects of wireless communications system 100, 200, 300, or any combination thereof. For example, process flow 500 may illustrate improved SIB acquisition techniques, as described with reference to FIGS. 1-4, among other aspects.

The process flow 500 may include a satellite 120-d and a UE 115-e, which may be examples of a gNB (or base station 105) and a UE 115 as described with reference to FIGS. 1-4. In the following description of the process flow 500, the operations between the satellite 120-d and the UE 115-e may be performed in a different order than the example order shown, or the operations performed by the satellite 120-d and the UE 115-e may be performed in different orders or at different times. Some operations may also be omitted from the process flow 500, and other operations may be added to the process flow 500. In some examples, the operations illustrated in process flow 500 may be performed by hardware (e.g., including circuitry, processing blocks, logic components, and other components), code (e.g., software or firmware) executed by a processor, or any combination thereof.

In the example of FIG. 5, the satellite 120-d and the UE 115-e may be in communication with each other via an NTN. In particular, the satellite 120-d and the UE 115-e may be in communication with each other via one or more cells of an NTN supported by the satellite 120-d. The process flow 500 may support improved SIB acquisition within the wireless communications system 100, 200, 300, or any combination thereof (e.g., improved SIB acquisition within an NTN).

At 505, the UE 115-e may receive a set of SIBs common to a set of cells of an NTN supported by the satellite 120-d (e.g., common SIBs). In some aspects, the set of SIBs received at 505 may include an indication of one or more parameters common to the set of cells for communications with the set of cells. In some cases, the set of cells may include every cell supported by the satellite 120-d, every cell of the NTN, or both. Additionally or alternatively, the set of cells may include a sub-set of cells supported by the satellite 120-d, a sub-set of cells of the NTN, or both. The set of SIBs may include an indication of a set of PIDs associated with the set of cells.

At 510, the UE 115-e may receive a configuration message including an indication of a set of downlink resources for receiving SIBs which include the cell-specific information associated with the set of cells of the NTN. In this regard, the configuration message received at 510 may include an indication of a set of downlink resources which the UE 115-e is to monitor for receiving SIBs from cells of the NTN which include cell-specific information. Accordingly, the UE 115-e may monitor the set of downlink resources based on receiving the configuration message including the indication at 510.

At 515, the UE 115-e may receive one or more SIBs associated with a first cell of the NTN supported by the satellite 120-d. The one or more SIBs received at 515 may include cell-specific information indicating a first set of cell-specific parameters for communicating with the first cell. For example, the UE 115-e may receive a first SIB associated with the first cell, where the first SIB includes cell-specific information associated with the first cell which indicates a first set of cell-specific parameters for communications with the first cell. In some aspects, the UE 115-e may receive the cell-specific SIBs from the first cell at 515 based on receiving the configuration message including the indication of the set of downlink resources at 510. In some aspects, the first SIB associated with the first cell may include a first PID associated with the first cell. In this regard, the UE 115-e may determine whether the first cell is included within the set of cells associated with the set of parameters common to the set of cells based on the set of PIDs associated with the set of cells, the first PID associated with the first cell, or any combination thereof.

In some aspects, the UE 115-e may receive, from the first cell, an indication of a neighbor cell list associated with the first cell. For example, the first SIB including the first set of cell-specific parameters received at 515 may include an indication of a neighbor cell list associated with the first cell. Additionally or alternatively, the first SIB including the first set of cell-specific parameters associated with the first cell may include an indication of one or more parameters associated with at least one cell of the neighbor cell list. For example, the first SIB including the first set of cell-specific parameters associated with the first cell may include one or more SIBs associated with at least one cell of the neighbor cell list.

At 520, the UE 115-e may identify differences, if any, between the set of parameters common to the set of cells indicated in the SIB(s) received at 505 and the set of cell-specific parameters indicated by the cell-specific SIB(s) received at 515. For example, the UE 115-e may identify a cell-specific parameter of the first set of cell-specific parameters indicated in the cell-specific information received at 515 that is different than a parameter of the set of parameters common to the set of cells indicated by the set of SIBs received at 505. By way of another example, the UE 115-e may identify a difference between a parameter of the set of parameters common to the set of cells and a cell-specific parameter of the first set of cell-specific parameters associated with the first cell.

At 525, the UE 115-e may communicate with the first cell supported by the satellite 120-d (e.g., first cell of the NTN). In some aspects, the UE 115-e may communicate with the first cell based on the one or more parameters common to the set of cells indicated in the SIB(s) received at 505, the one or more cell-specific parameters indicated in the SIB(s) received at 515, or any combination thereof. For example, the UE 115-e may communicate with the first cell based on at least a first sub-set of parameters of the one or more parameters common to the set of cells and the first set of cell-specific parameters associated with the first cell. Additionally, the UE 115-e may communicate with the first cell at 525 based on identifying differences between the set of common parameters the set of cell-specific parameters at 520. In some cases, the first cell may not utilize any cell-specific parameters. In such a case, the UE 115-e may communicate with the first cell at 525 using only the set of parameters common to the set of cells.

At 530, the UE 115-e may receive a downlink message from the satellite 120-d, where the downlink message includes an indication that an update to the first set of cell-specific parameters associated with the first cell (e.g., SI update) is available. The downlink message may include an indication of at least one cell-specific parameter of the first set of cell-specific parameters associated with the first cell. In some cases, the UE 115-e may identify or determine that the update to the set of parameters associated with the first cell is available based on the downlink message received at 535. In additional or alternative aspects, the UE 115-e may determine that the update is available based on determining an expiration of a validity period associated with the first SIB associated with the first cell.

At 535, the UE 115-*e* may determine whether or not to perform the update (e.g., SI update) to the at least one cell-specific parameter of the first set of cell-specific parameters associated with, or to initiate a random access procedure with, the first cell. The UE 115-*e* may determine whether or not to perform the update to the first set of cell-specific parameters associated with, or to initiate a random access procedure with, the first cell based on an expected duration until a cell reselection procedure (e.g., expected duration until a cell reselection procedure with a second cell), an expected duration that the UE 115-*e* is expected to remain within the first cell, a position (e.g., location) of the UE 115-*e* within the NTN, whether a random access procedure has been initiated or completed, or any combination thereof.

For example, in some cases, the UE 115-*e* may update the first SIB associated with the first cell received at 515 based on receiving the downlink message including the indication of the change to at least one cell-specific parameter of the first set of cell-specific parameters associated with the first cell. The UE 115-*e* may then communicate with the first cell based on updating the first SIB associated with the first cell. By way of another example, in some aspects, the UE 115-*e* may determine that an expected duration until initiating a cell reselection procedure with the second cell satisfies a threshold. For instance, the UE 115-*e* may determine that the expected duration until initiating a cell reselection procedure with the second cell is less than a threshold duration. In this example, the UE 115-*e* may refrain from updating the first set of cell-specific parameters associated with the first cell based on determining that the expected duration satisfies the threshold.

In some cases, the UE 115-*e* may communicate with the first cell based on updating (or not updating) the set of cell-specific parameters associated with the first cell at 535 (e.g., based on updating or not updating the cell-specific SIBs received at 515).

At 540, the UE 115-*e* may receive one or more SIBs associated with a second cell of the NTN supported by the satellite 120-*d*. The one or more SIBs received at 540 may include cell-specific information indicating a second set of cell-specific parameters for communicating with the second cell. For example, due to the movement of the satellite 120-*d*, the UE 115-*e* may experience changing cell coverage, and may move from the first cell to the second cell. In this example, the UE 115-*e* may receive a second SIB associated with the second cell, where the second SIB includes cell-specific information associated with the second cell which indicates a second set of cell-specific parameters for communications with the second cell. In some aspects, the UE 115-*e* may receive the cell-specific SIBs from the second cell at 545 based on receiving the configuration message including the indication of the set of downlink resources at 510. In some cases, the UE 115-*e* may identify differences, if any, between the set of common parameters indicated by the common SIB(s) received at 505 and the second set of cell-specific parameters indicated by the cell-specific SIB(s) received at 540.

At 545, the UE 115-*e* may communicate with the second cell supported by the satellite 120-*d* (e.g., second cell of the NTN). In some aspects, the UE 115-*e* may communicate with the second cell based on the one or more parameters common to the set of cells indicated in the SIB(s) received at 505, the second set of cell-specific parameters associated with the second cell indicated in the SIB(s) received at 545, or any combination thereof. For example, the UE 115-*e* may communicate with the second cell using at least a second sub-set of the set of parameters common to the set of cells and the second set of cell-specific parameters associated with the second cell. Additionally, the UE 115-*e* may communicate with the second cell at 550 based on identifying differences between the set of parameters common to the set of cells and the second set of cell-specific parameters associated with the second cell. In some cases, the second cell may not utilize any cell-specific parameters. In such a case, the UE 115-*e* may communicate with the second cell using only the set of parameters common to the set of cells.

The techniques of process flow 500 may improve SIB acquisition in the wireless communications system 100, 200, and 300. In particular, the techniques of process flow 500 may enable the UE 115-*e* to acquire only cell-specific parameters which are specific to a new cell upon entering the new cell, thereby preventing the UE 115-*e* from having to acquire the full set of SIBs. Accordingly, these techniques may reduce resource and signaling overhead associated with SIB acquisition within the wireless communications system 100, 200, or 300, and may additionally reduce power consumption at the UE 115-*e* and the satellite 120-*d*.

Figure 6:
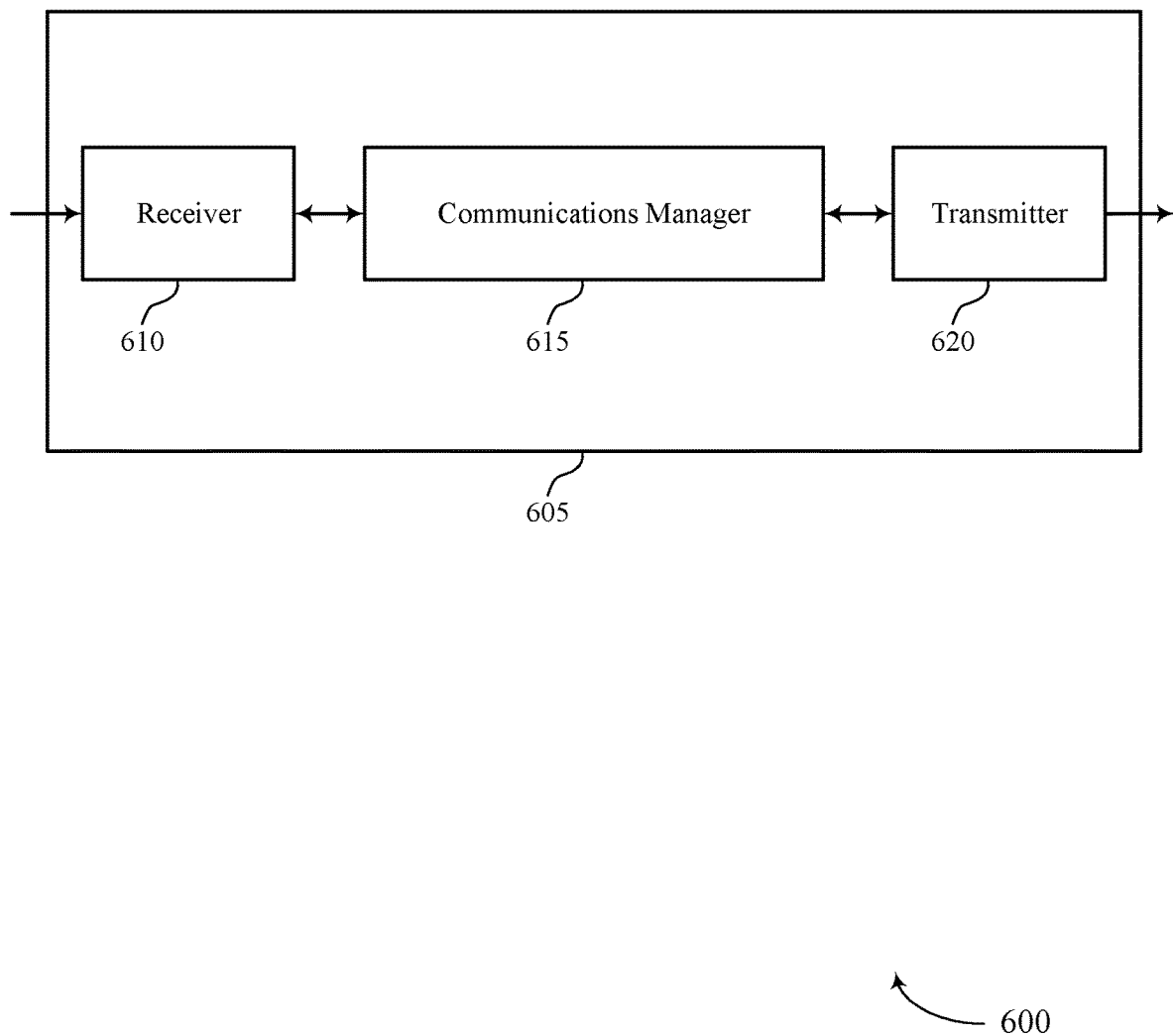
FIGS. 6 and 7 show block diagrams of devices that support SIB acquisition for wireless networks in accordance with aspects of the present disclosure.

FIG. 6 shows a block diagram 600 of a device 605 that supports SIB acquisition for wireless networks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to SIB acquisition for wireless networks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate with a first cell of an NTN using a set of parameters associated with the first cell, communicate with the second cell of the NTN using the set of parameters based on determining that the set of parameters stored by the UE for the first cell is usable for communicating with the second cell, receive a control message associated with a second cell of the NTN, the control message including an indication that the set of parameters associated with the first cell is usable for communicating with the second cell, and determine that the set of parameters associated with the first cell is usable for communicating with the second cell based on receiving the indication. The communications manager 615 may also receive a set of SIBs common to a set of cells of an NTN, the set of SIBs indicating one or more parameters common to the set of cells for communications with the set of cells, receive a first SIB associated with a first cell of the set of cells of the NTN, the first SIB including cell-specific information indicating a first set of cell-specific parameters for communications with the first cell, and communicate with the first cell using the first set of cell-specific parameters associated with the cell-specific information of the first cell and at least a first sub-set of parameters of the one or more parameters that are common to the set of cells. The communications manager 615 may be an example of aspects of the communications manager 910 described herein.

The actions performed by the communications manager 615 as described herein may be implemented to realize one or more potential advantages. For example, by reducing a quantity of times a UE 115 may acquire a new SIB for a new cell, the communications manager 615 may reduce resource and signaling overhead associated with SIB acquisition within a wireless communications system. Reducing the quantity of times a UE 115 may acquire a new SIB for a new cell may be particularly important in the context of NTNs, which may exhibit frequent changes in cell coverage. Moreover, by reducing resource and signaling overhead associated with SIB acquisition, the communications manager 615 may reduce power consumption at the UE 115.

Based on reducing a number of times a UE 115 may acquire a new SIB for a new cell, the UE 115 (e.g., a processor controlling the receiver 610, the communications manager 615, the transmitter 620, etc.) may reduce processing resources used for downlink and uplink communications. For example, reducing a quantity of times the UE 115 may acquire a new SIB for a new cell may correspondingly reducing a number of times the processor ramps up processing power and turns on processing units to handle downlink reception and uplink transmission.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
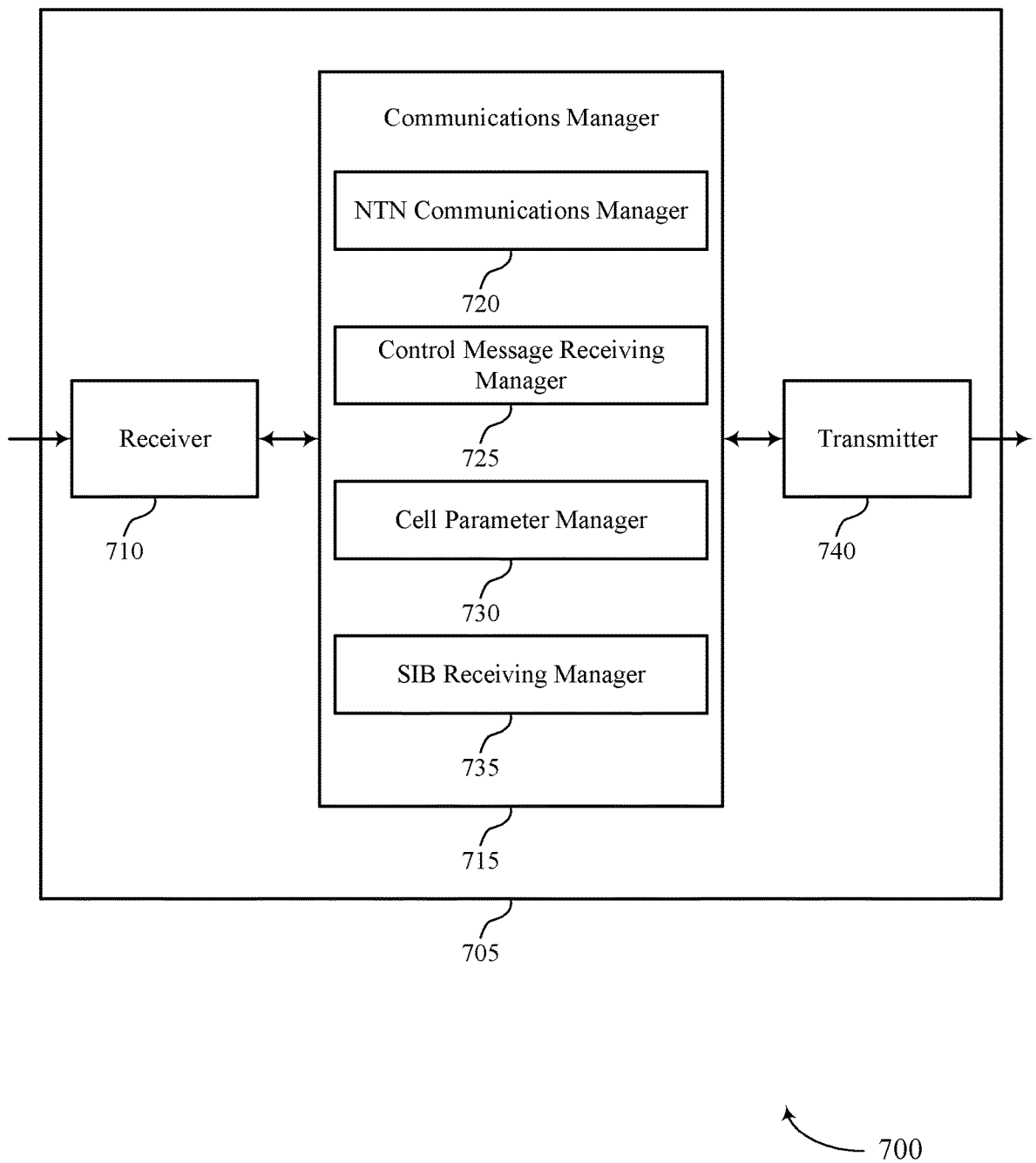

FIG. 7 shows a block diagram 700 of a device 705 that supports SIB acquisition for wireless networks in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to SIB acquisition for wireless networks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an NTN communications manager 720, a control message receiving manager 725, a cell parameter manager 730, and a SIB receiving manager 735. The communications manager 715 may be an example of aspects of the communications manager 910 described herein.

The NTN communications manager 720 may communicate with a first cell of an NTN using a set of parameters associated with the first cell and communicate with the second cell of the NTN using the set of parameters based on determining that the set of parameters stored by the UE for the first cell is usable for communicating with the second cell.

The control message receiving manager 725 may receive a control message associated with a second cell of the NTN, the control message including an indication that the set of parameters associated with the first cell is usable for communicating with the second cell. The cell parameter manager 730 may determine that the set of parameters associated with the first cell is usable for communicating with the second cell based on receiving the indication.

The SIB receiving manager 735 may receive a set of SIBs common to a set of cells of an NTN, the set of SIBs indicating one or more parameters common to the set of cells for communications with the set of cells and receive a first SIB associated with a first cell of the set of cells of the NTN, the first SIB including cell-specific information indicating a first set of cell-specific parameters for communications with the first cell.

The NTN communications manager 720 may communicate with the first cell using the first set of cell-specific parameters associated with the cell-specific information of the first cell and at least a first sub-set of parameters of the one or more parameters that are common to the set of cells.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
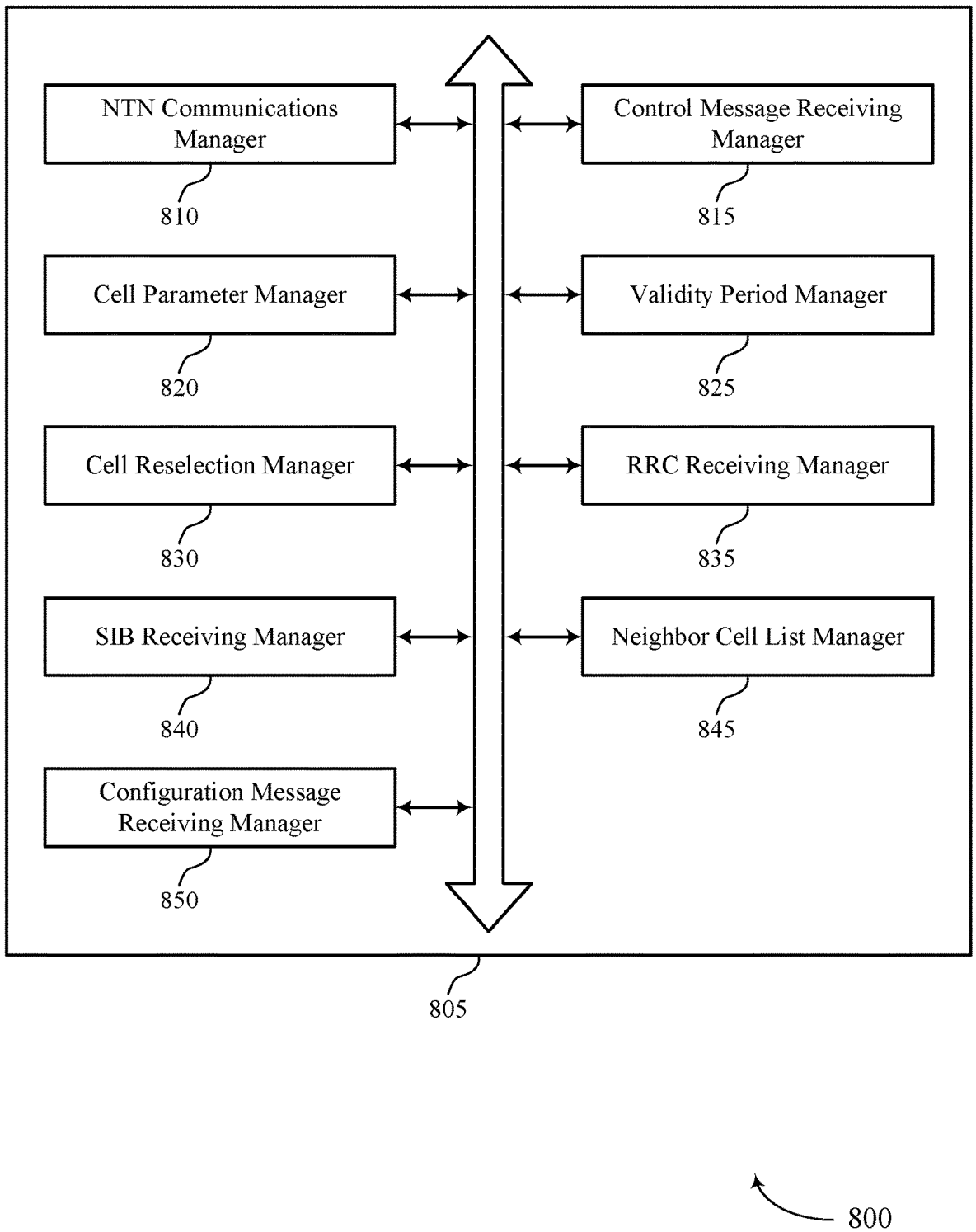
FIG. 8 shows a block diagram of a communications manager that supports SIB acquisition for wireless networks in accordance with aspects of the present disclosure.

FIG. 8 shows a block diagram 800 of a communications manager 805 that supports SIB acquisition for wireless networks in accordance with aspects of the present disclosure. The communications manager 805 may be an example of aspects of a communications manager 615, a communications manager 715, or a communications manager 910 described herein. The communications manager 805 may include an NTN communications manager 810, a control message receiving manager 815, a cell parameter manager 820, a validity period manager 825, a cell reselection manager 830, an RRC receiving manager 835, a SIB receiving manager 840, a neighbor cell list manager 845, and a configuration message receiving manager 850. Each of these modules may communicate, directly or indirectly, with one another (e.g., via one or more buses).

The NTN communications manager 810 may communicate with a first cell of an NTN using a set of parameters associated with the first cell. In some examples, the NTN communications manager 810 may communicate with the second cell of the NTN using the set of parameters based on determining that the set of parameters stored by the UE for the first cell is usable for communicating with the second cell. In some examples, the NTN communications manager 810 may communicate with the first cell using the first set of cell-specific parameters associated with the cell-specific information of the first cell and at least a first sub-set of parameters of the one or more parameters that are common to the set of cells.

In some examples, the NTN communications manager 810 may communicate with the third cell based on receiving the one or more SIBs. In some examples, the NTN communications manager 810 may communicate with a second cell using the one or more parameters indicated by the set of SIBs that are common to the set of cells. In some examples, the NTN communications manager 810 may communicate with the first cell based on updating the first SIB. In some examples, the NTN communications manager 810 may communicate with the second cell using the second set of cell-specific parameters associated with the cell-specific information of the first cell and at least a second sub-set of parameters of the one or more parameters that are common to the set of cells.

The control message receiving manager 815 may receive a control message associated with a second cell of the NTN, the control message including an indication that the set of parameters associated with the first cell is usable for communicating with the second cell. In some examples, the control message receiving manager 815 may receive a second control message associated with a third cell of the NTN. In some cases, the control message includes an SSB or a MIB.

The cell parameter manager 820 may determine that the set of parameters associated with the first cell is usable for communicating with the second cell based on receiving the indication. In some examples, the cell parameter manager 820 may determine that the set of parameters stored by the UE for the first cell is not usable for communicating with a third cell of the NTN. In some examples, the cell parameter manager 820 may identify that an update to the set of parameters associated with the first cell is available. In some examples, the cell parameter manager 820 may refrain from updating the set of parameters based on determining that the expected duration satisfies the threshold. In some examples, the cell parameter manager 820 may identify that an update to the set of parameters associated with the second cell is available.

In some examples, the cell parameter manager 820 may identify a cell-specific parameter of the first set of cell-specific parameters that is different than a common parameter indicated by the set of SIBs common to the set of cells, the cell-specific information included in the first SIB indicating the cell-specific parameter, where communicating with the first cell is based on identifying the cell-specific parameter. In some examples, the cell parameter manager 820 may identify a difference between a common parameter indicated by the set of SIBs common to the set of cells and a cell-specific parameter of the first set of cell-specific parameters, the cell-specific information included in the first SIB indicating the difference, where communicating with the first cell is based on identifying the difference.

In some examples, the cell parameter manager 820 may receive, from the first cell, a downlink message including an indication of a change in at least one cell-specific parameter of the first set of cell-specific parameters associated with the first cell. In some examples, the cell parameter manager 820 may update the first SIB associated with the first cell based on receiving the downlink message. In some examples, the cell parameter manager 820 may identify that an update to the first set of cell-specific parameters associated with the first cell is available. In some examples, the cell parameter manager 820 may refrain from updating the first set of cell-specific parameters based on determining that the expected duration satisfies the threshold. In some cases, the set of parameters are used by each cell of the NTN associated with a satellite of the NTN. In some cases, the set of parameters are used by a sub-set of cells of the NTN associated with a satellite of the NTN.

The SIB receiving manager 840 may receive a set of SIBs common to a set of cells of an NTN, the set of SIBs indicating one or more parameters common to the set of cells for communications with the set of cells. In some examples, the SIB receiving manager 840 may receive a first SIB associated with a first cell of the set of cells of the NTN, the first SIB including cell-specific information indicating a first set of cell-specific parameters for communications with the first cell. In some examples, the SIB receiving manager 840 may receive one or more SIBs associated with the third cell based on determining that the set of parameters stored by the UE for the first cell is not usable for communicating with the third cell. In some examples, the SIB receiving manager 840 may receive one or more SIBs associated with the first cell that include the set of parameters for communicating with the first cell of the NTN, where communicating with the first cell is based on receiving the one or more SIBs. In some examples, the SIB receiving manager 840 may receive a second SIB associated with a second cell of the set of cells of the NTN, the second SIB including second cell-specific information indicating a second set of cell-specific parameters for communications with the second cell.

The validity period manager 825 may receive a second indication of a validity period associated with the set of parameters, where determining that the set of parameters stored by the UE for the first cell is usable for communicating with the second cell is based on the validity period. In some examples, the validity period manager 825 may determine that the set of parameters are unchanged during a validity period based on receiving the indication. In some examples, the validity period manager 825 may determine the set of parameters associated with the first cell was received outside of a validity period associated with the set of parameters, where receiving the one or more SIBs associated with the third cell is based on determining that the set of parameters associated with the first cell was received outside of the validity period. In some cases, the second indication of the validity period is received as part of a SIB, an SSB, or a combination thereof.

The cell reselection manager 830 may select to communicate with the second cell based on the set of parameters stored by the UE being associated with the second cell and not the third cell, where communicating with the second cell is based on selecting to communicate with the second cell. In some examples, the cell reselection manager 830 may determine that the first cell belongs to a set of cells based on a second indication of a set of physical cell identifiers associated with the set of parameters. In some examples, the cell reselection manager 830 may select the second cell as part of an intra-frequency cell reselection procedure or an inter-frequency cell reselection procedure with the second cell, where communicating with the second cell is based on selecting the second cell. In some examples, the cell reselection manager 830 may select the second cell as part of an intra-frequency cell reselection procedure with the second cell, where communicating with the second cell is based on selecting the second cell. In some examples, the cell reselection manager 830 may select the second cell as part of an inter-frequency cell reselection procedure with the second cell, where communicating with the second cell is based on selecting the second cell.

In some examples, the cell reselection manager 830 may determine that an expected duration until initiating a cell reselection procedure with the second cell satisfies a threshold. In some examples, the cell reselection manager 830 may perform the cell reselection procedure with the second cell based on determining that the expected duration satisfies the threshold. In some examples, the cell reselection manager 830 may refrain from performing an attachment procedure with the second cell based on identifying that the update to the set of parameters for the first cell is available. In some examples, the cell reselection manager 830 may perform a cell reselection procedure with a third cell of the NTN based on identifying that the update to the set of parameters for the first cell is available.

In some examples, the cell reselection manager 830 may determine that an expected duration until initiating a cell reselection procedure with a second cell satisfies a threshold. In some examples, the cell reselection manager 830 may perform the cell reselection procedure with the second cell based on determining that the expected duration satisfies the threshold. In some examples, the cell reselection manager 830 may refrain from performing an attachment procedure with the first cell based on identifying that the update to the first set of cell-specific parameters for the first cell is available. In some examples, the cell reselection manager 830 may perform a cell reselection procedure with a second cell based on identifying that the update to the first set of cell-specific parameters for the first cell is available.

The RRC receiving manager 835 may receive an RRC message or a NAS message including one or more sets of SIBs associated with a set of cells of the NTN based on a predicted path of the UE relative to the NTN, where the set of cells includes the first cell and the second cell, where communicating with the first cell is based on receiving the RRC message or the NAS message.

The neighbor cell list manager 845 may receive a downlink message including a neighbor cell list associated with the first cell and one or more parameters associated with at least one cell of the neighbor cell list, where communicating with the first cell is based on receiving the downlink message. In some examples, the neighbor cell list manager 845 may refrain from updating the neighbor cell list associated with the second cell based on selecting the second cell as part of the intra-frequency cell reselection procedure or the inter-frequency cell reselection procedure. In some examples, the neighbor cell list manager 845 may update the neighbor cell list associated with the second cell based on selecting the second cell as part of the intra-frequency cell reselection procedure. In some examples, the neighbor cell list manager 845 may update the neighbor cell list associated with the second cell based on selecting the second cell as part of the inter-frequency cell reselection procedure. In some examples, the neighbor cell list manager 845 may receive an indication of a neighbor cell list associated with the first cell based on receiving the first SIB from the first cell.

The configuration message receiving manager 850 may receive a configuration message including an indication of a set of downlink resources for receiving SIBs that include the cell-specific information, where receiving the first SIB for the first cell is based on receiving the configuration message.

Figure 9:
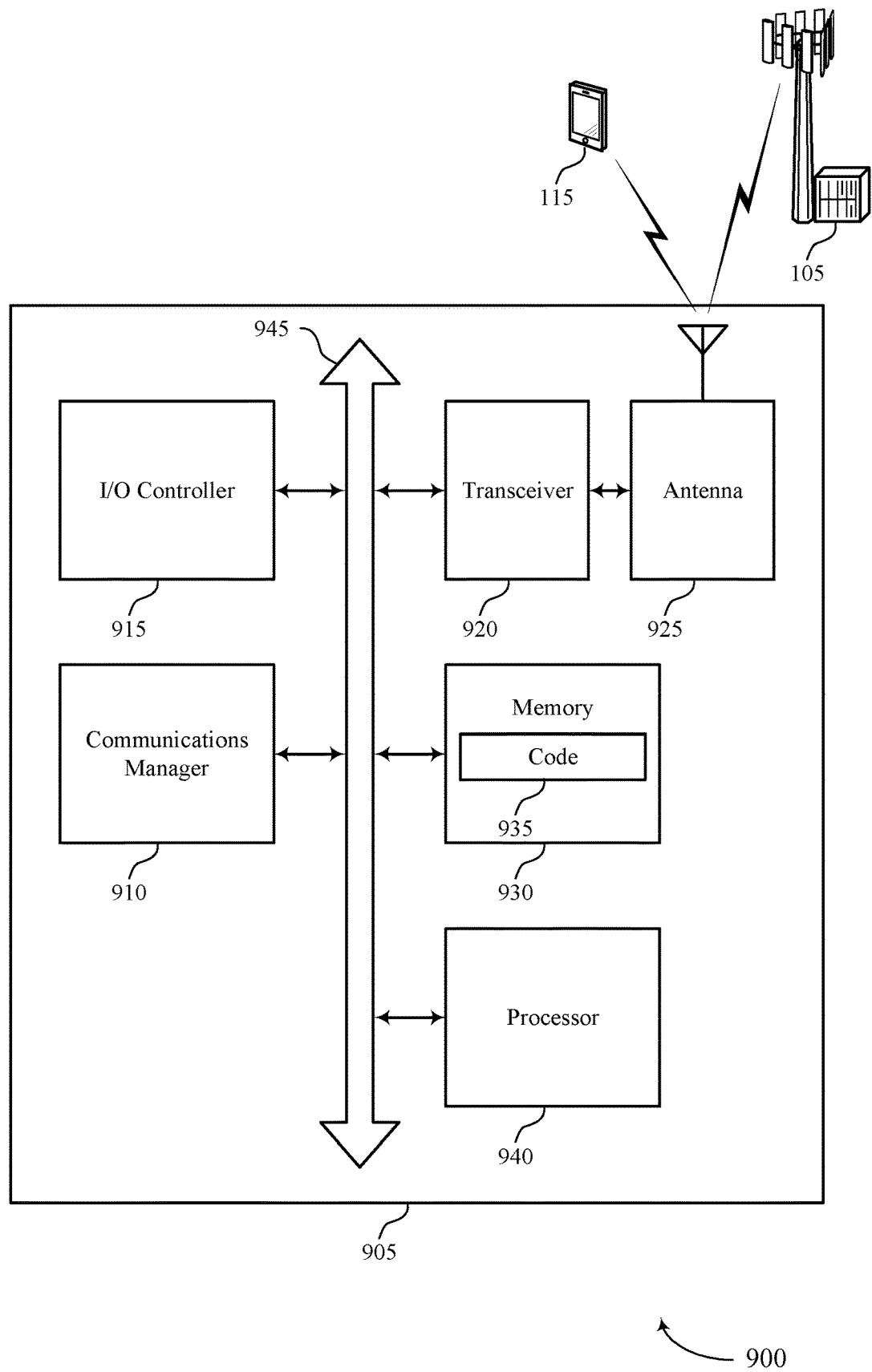
FIG. 9 shows a diagram of a system including a device that supports SIB acquisition for wireless networks in accordance with aspects of the present disclosure.

FIG. 9 shows a diagram of a system 900 including a device 905 that supports SIB acquisition for wireless networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate with a first cell of an NTN using a set of parameters associated with the first cell, communicate with the second cell of the NTN using the set of parameters based on determining that the set of parameters stored by the UE for the first cell is usable for communicating with the second cell, receive a control message associated with a second cell of the NTN, the control message including an indication that the set of parameters associated with the first cell is usable for communicating with the second cell, and determine that the set of parameters associated with the first cell is usable for communicating with the second cell based on receiving the indication. The communications manager 910 may also receive a set of SIBs common to a set of cells of an NTN, the set of SIBs indicating one or more parameters common to the set of cells for communications with the set of cells, receive a first SIB associated with a first cell of the set of cells of the NTN, the first SIB including cell-specific information indicating a first set of cell-specific parameters for communications with the first cell, and communicate with the first cell using the first set of cell-specific parameters associated with the cell-specific information of the first cell and at least a first sub-set of parameters of the one or more parameters that are common to the set of cells.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting SIB acquisition for wireless networks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
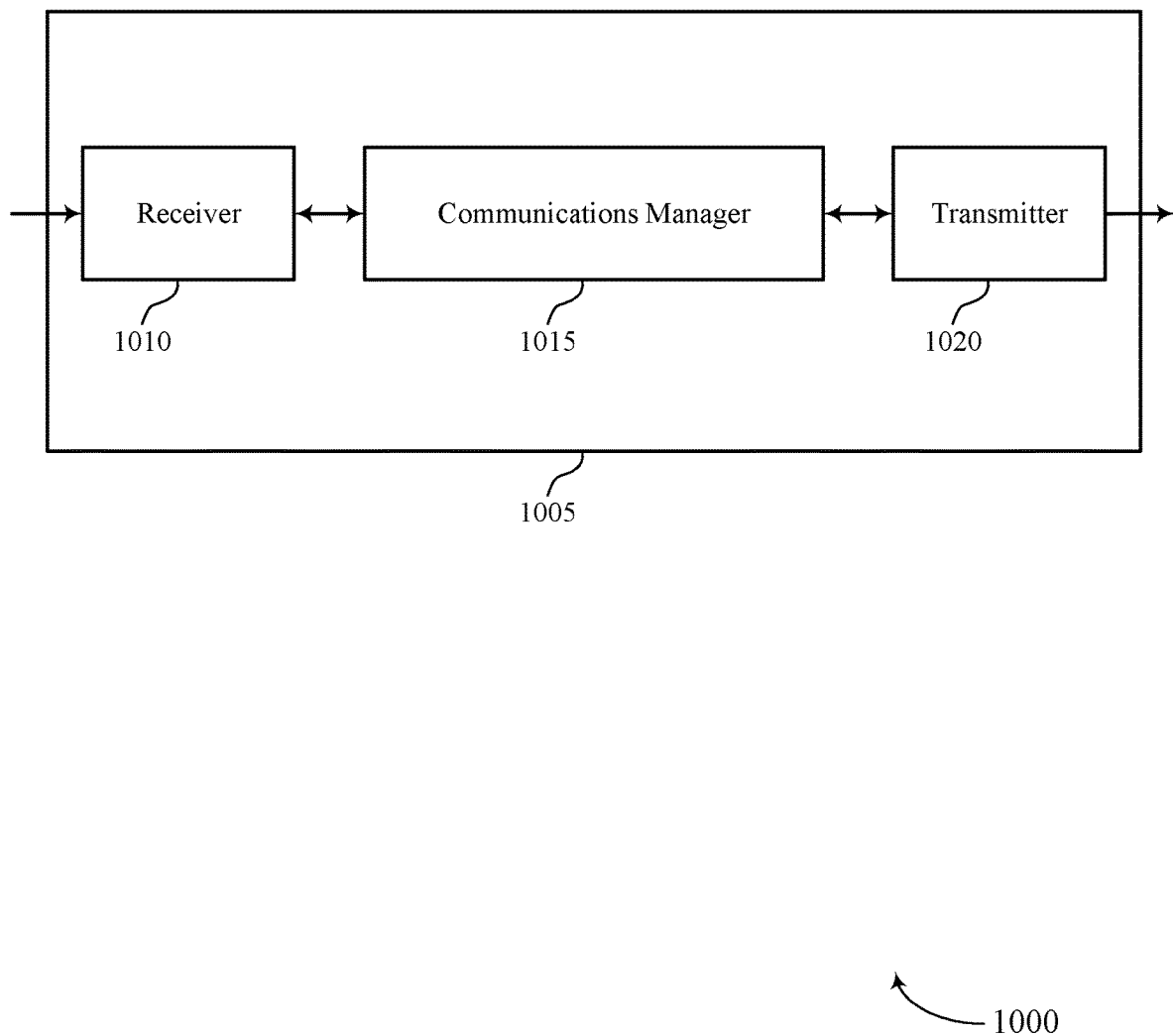
FIGS. 10 and 11 show block diagrams of devices that support SIB acquisition for wireless networks in accordance with aspects of the present disclosure.

FIG. 10 shows a block diagram 1000 of a device 1005 that supports SIB acquisition for wireless networks in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to SIB acquisition for wireless networks, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a UE via first cell of an NTN using a set of parameters associated with the first cell, communicate with the UE via the second cell of the NTN using the set of parameters based on transmitting the control message, and transmit a control message associated with a second cell of the NTN, the control message including an indication that the set of parameters associated with the first cell is usable for communicating with the second cell. The communications manager 1015 may also transmit, to a UE, a set of SIBs common to a set of cells of an NTN, the set of SIBs indicating one or more parameters common to the set of cells for communications with the set of cells, transmit a first SIB associated with a first cell of the set of cells of the NTN, the first SIB including cell-specific information indicating a first set of cell-specific parameters for communications with the first cell, and communicate with the UE via the first cell using the first set of cell-specific parameters associated with the cell-specific information of the first cell and at least a first sub-set of parameters of the one or more parameters that are common to the set of cells. The communications manager 1015 may be an example of aspects of the communications manager 1310 described herein.

The actions performed by the communications manager 1015 as described herein may be implemented to realize one or more potential advantages. For example, by reducing a quantity of times a UE 115 may acquire a new SIB for a new cell (e.g., reducing a quantity of times the base station 105 transmits a new SIB for a new cell), the communications manager 1015 may reduce resource and signaling overhead associated with SIB acquisition within a wireless communications system. Reducing the quantity of times a UE 115 may acquire a new SIB for a new cell may be particularly important in the context of NTNs, which may exhibit frequent changes in cell coverage. Moreover, by reducing resource and signaling overhead associated with SIB acquisition, the communications manager 1015 may reduce power consumption at the UE 115 and the base station 105.

Based on reducing a number of times a UE 115 may acquire a new SIB for a new cell (e.g., reducing a quantity of times the base station 105 transmits a new SIB for a new cell), the UE 115 (e.g., a processor controlling the receiver 1010, the communications manager 1015, the transmitter 1020, etc.) may reduce processing resources used for downlink and uplink communications. For example, reducing a quantity of times the base station 105 may transmit a new SIB for a new cell may correspondingly reducing a number of times the processor ramps up processing power and turns on processing units to handle downlink transmission and uplink reception.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
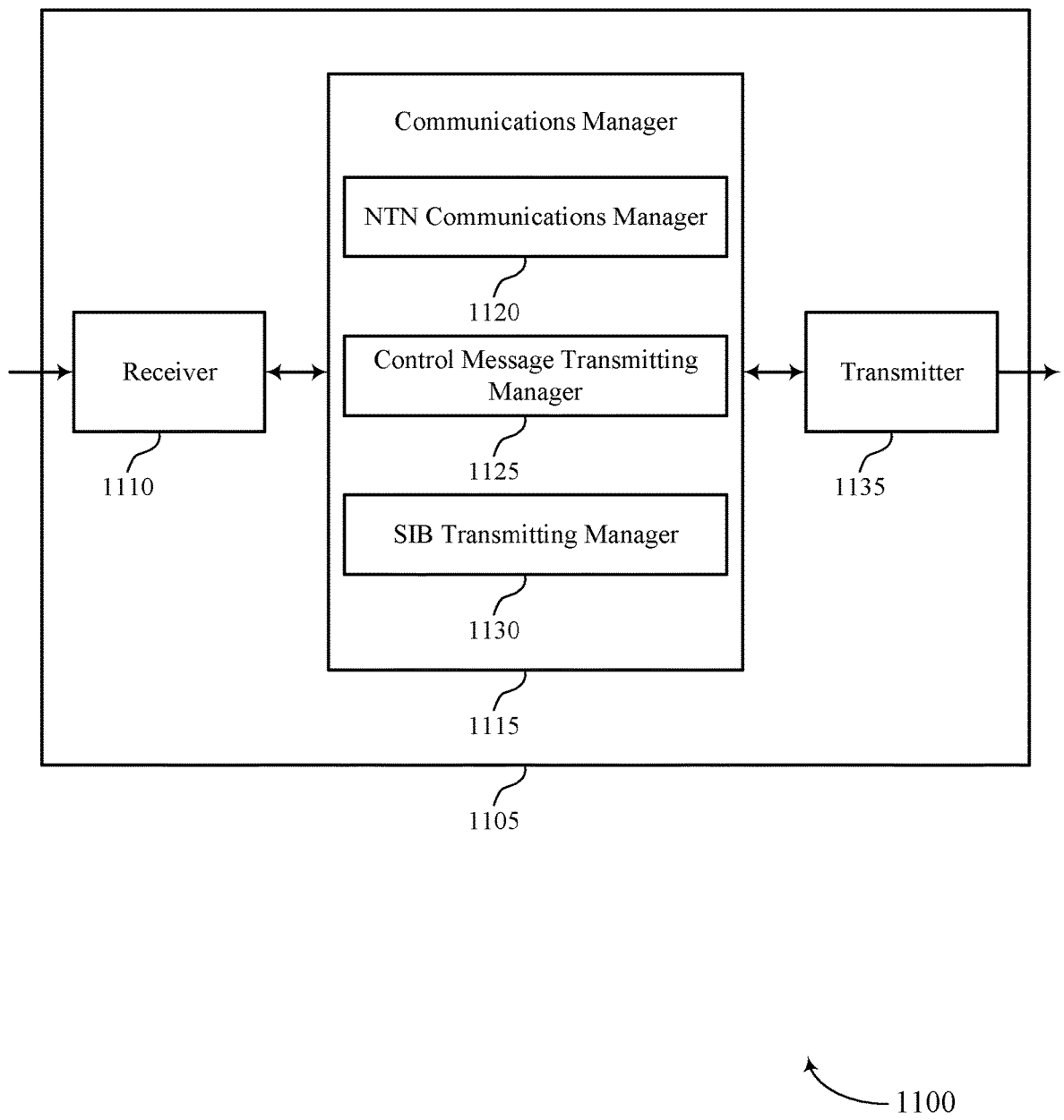

FIG. 11 shows a block diagram 1100 of a device 1105 that supports SIB acquisition for wireless networks in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to SIB acquisition for wireless networks, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an NTN communications manager 1120, a control message transmitting manager 1125, and a SIB transmitting manager 1130. The communications manager 1115 may be an example of aspects of the communications manager 1310 described herein.

The NTN communications manager 1120 may communicate with a UE via first cell of an NTN using a set of parameters associated with the first cell and communicate with the UE via the second cell of the NTN using the set of parameters based on transmitting the control message.

The control message transmitting manager 1125 may transmit a control message associated with a second cell of the NTN, the control message including an indication that the set of parameters associated with the first cell is usable for communicating with the second cell.

The SIB transmitting manager 1130 may transmit, to a UE, a set of SIBs common to a set of cells of an NTN, the set of SIBs indicating one or more parameters common to the set of cells for communications with the set of cells and transmit a first SIB associated with a first cell of the set of cells of the NTN, the first SIB including cell-specific information indicating a first set of cell-specific parameters for communications with the first cell.

The NTN communications manager 1120 may communicate with the UE via the first cell using the first set of cell-specific parameters associated with the cell-specific information of the first cell and at least a first sub-set of parameters of the one or more parameters that are common to the set of cells.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
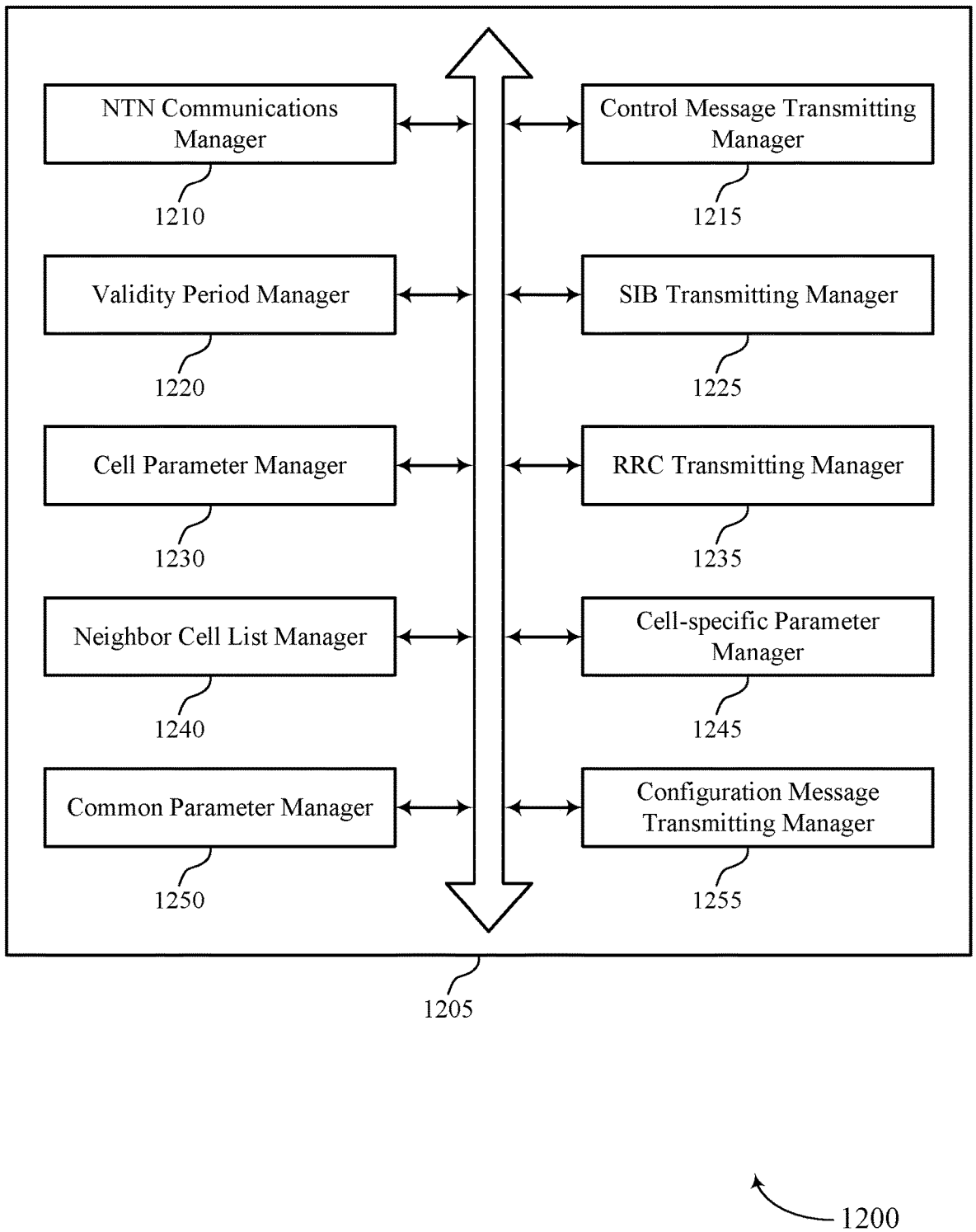
FIG. 12 shows a block diagram of a communications manager that supports SIB acquisition for wireless networks in accordance with aspects of the present disclosure.

FIG. 12 shows a block diagram 1200 of a communications manager 1205 that supports SIB acquisition for wireless networks in accordance with aspects of the present disclosure. The communications manager 1205 may be an example of aspects of a communications manager 1015, a communications manager 1115, or a communications manager 1310 described herein. The communications manager 1205 may include an NTN communications manager 1210, a control message transmitting manager 1215, a validity period manager 1220, a SIB transmitting manager 1225, a cell parameter manager 1230, an RRC transmitting manager 1235, a neighbor cell list manager 1240, a cell-specific parameter manager 1245, a common parameter manager 1250, and a configuration message transmitting manager 1255. Each of these modules may communicate, directly or indirectly, with one another (e.g., via one or more buses).

The NTN communications manager 1210 may communicate with a UE via first cell of an NTN using a set of parameters associated with the first cell. In some examples, the NTN communications manager 1210 may communicate with the UE via the second cell of the NTN using the set of parameters based on transmitting the control message. In some examples, the NTN communications manager 1210 may communicate with the UE via the first cell using the first set of cell-specific parameters associated with the cell-specific information of the first cell and at least a first sub-set of parameters of the one or more parameters that are common to the set of cells. In some examples, the NTN communications manager 1210 may communicate with the UE via the third cell based on transmitting the one or more SIBs. In some examples, the NTN communications manager 1210 may communicate with the UE via the first cell based on transmitting the downlink message. In some examples, the NTN communications manager 1210 may communicate with the UE via the second cell using the second set of cell-specific parameters associated with the cell-specific information of the first cell and at least a second sub-set of parameters of the one or more parameters that are common to the set of cells.

The control message transmitting manager 1215 may transmit a control message associated with a second cell of the NTN, the control message including an indication that the set of parameters associated with the first cell is usable for communicating with the second cell. In some cases, the control message includes an SSB or a MIB.

The SIB transmitting manager 1225 may transmit, to a UE, a set of SIBs common to a set of cells of an NTN, the set of SIBs indicating one or more parameters common to the set of cells for communications with the set of cells. In some examples, the SIB transmitting manager 1225 may transmit a first SIB associated with a first cell of the set of cells of the NTN, the first SIB including cell-specific information indicating a first set of cell-specific parameters for communications with the first cell. In some examples, the SIB transmitting manager 1225 may transmit one or more SIBs associated with the first cell and that include the set of parameters for communicating with the first cell of the NTN, where communicating with the first cell is based on receiving the one or more SIBs.

In some examples, the SIB transmitting manager 1225 may transmit a second indication of a set of physical cell identifiers associated with the set of parameters. In some examples, the SIB transmitting manager 1225 may transmit one or more SIBs associated with the third cell based on determining the second indication that the set of parameters associated with the first cell and stored by the UE is not usable for communicating with the third cell of the NTN. In some examples, the SIB transmitting manager 1225 may transmit a second SIB associated with a second cell of the set of cells of the NTN, the second SIB including second cell-specific information indicating a second set of cell-specific parameters for communications with the second cell.

The validity period manager 1220 may transmit a second indication of a validity period associated with the set of parameters, where communicating with the UE via the second cell of the NTN using the set of parameters is based on the validity period. In some cases, the second indication of the validity period is transmitted as part of a SIB, an SSB, or a combination thereof.

The cell parameter manager 1230 may determine a second indication that the set of parameters associated with the first cell and stored by the UE is not usable for communicating with a third cell of the NTN. In some cases, the set of parameters are used by each cell of the NTN associated with a satellite of the NTN. In some cases, the set of parameters are used by a sub-set of cells of the NTN associated with a satellite of the NTN.

The RRC transmitting manager 1235 may transmit an RRC message or a NAS message including one or more sets of SIBs associated with a set of cells of the NTN based on a predicted path of the UE relative to the NTN, where the set of cells includes the first cell and the second cell, where communicating with the UE via the first cell is based on transmitting the RRC message or the NAS message.

The neighbor cell list manager 1240 may transmit a downlink message including a second indication of a neighbor cell list associated with the first cell and one or more parameters associated with at least one cell of the neighbor cell list, where communicating with the UE via the first cell is based on transmitting the downlink message. In some examples, the neighbor cell list manager 1240 may transmit an indication of a neighbor cell list associated with the first cell based on transmitting the first SIB from the first cell.

The cell-specific parameter manager 1245 may identify a cell-specific parameter of the first set of cell-specific parameters that is different than a common parameter indicated by the set of SIBs common to the set of cells, the cell-specific information included in the first SIB indicating the cell-specific parameter, where communicating with the UE via the first cell is based on identifying the cell-specific parameter. In some examples, the cell-specific parameter manager 1245 may identify a difference between a common parameter indicated by the set of SIBs common to the set of cells and a cell-specific parameter of the first set of cell-specific parameters, the cell-specific information included in the first SIB indicating the difference, where communicating with the UE via the first cell is based on identifying the difference. In some examples, the cell-specific parameter manager 1245 may transmit, to the UE via the first cell, a downlink message including an indication of a change in at least one cell-specific parameter of the first set of cell-specific parameters associated with the first cell.

The common parameter manager 1250 may communicate with the UE via a third cell using the one or more parameters indicated by the set of SIBs that are common to the set of cells. In some cases, the one or more parameters common to the set of cells are used by each cell of the NTN associated with a satellite of the NTN. In some cases, the one or more parameters common to the set of cells are used by a sub-set of cells of the NTN associated with a satellite of the NTN.

The configuration message transmitting manager 1255 may transmit a configuration message including an indication of a set of downlink resources for transmitting SIBs that include the cell-specific information, where transmitting the first SIB for the first cell is based on transmitting the configuration message.

Figure 13:
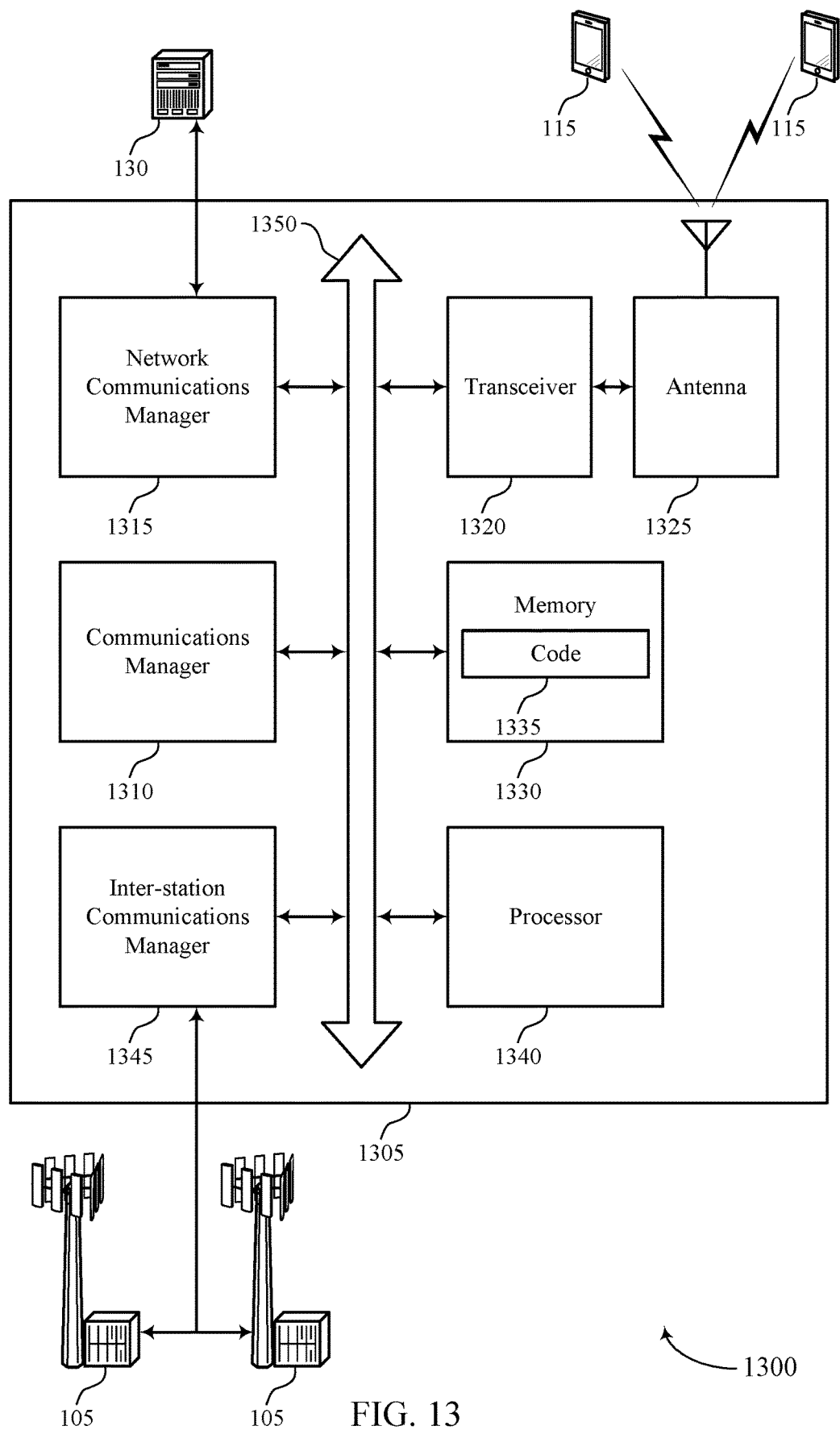
FIG. 13 shows a diagram of a system including a device that supports SIB acquisition for wireless networks in accordance with aspects of the present disclosure.

FIG. 13 shows a diagram of a system 1300 including a device 1305 that supports SIB acquisition for wireless networks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate with a UE via first cell of an NTN using a set of parameters associated with the first cell, communicate with the UE via the second cell of the NTN using the set of parameters based on transmitting the control message, and transmit a control message associated with a second cell of the NTN, the control message including an indication that the set of parameters associated with the first cell is usable for communicating with the second cell. The communications manager 1310 may also transmit, to a UE, a set of SIBs common to a set of cells of an NTN, the set of SIBs indicating one or more parameters common to the set of cells for communications with the set of cells, transmit a first SIB associated with a first cell of the set of cells of the NTN, the first SIB including cell-specific information indicating a first set of cell-specific parameters for communications with the first cell, and communicate with the UE via the first cell using the first set of cell-specific parameters associated with the cell-specific information of the first cell and at least a first sub-set of parameters of the one or more parameters that are common to the set of cells.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting SIB acquisition for wireless networks).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
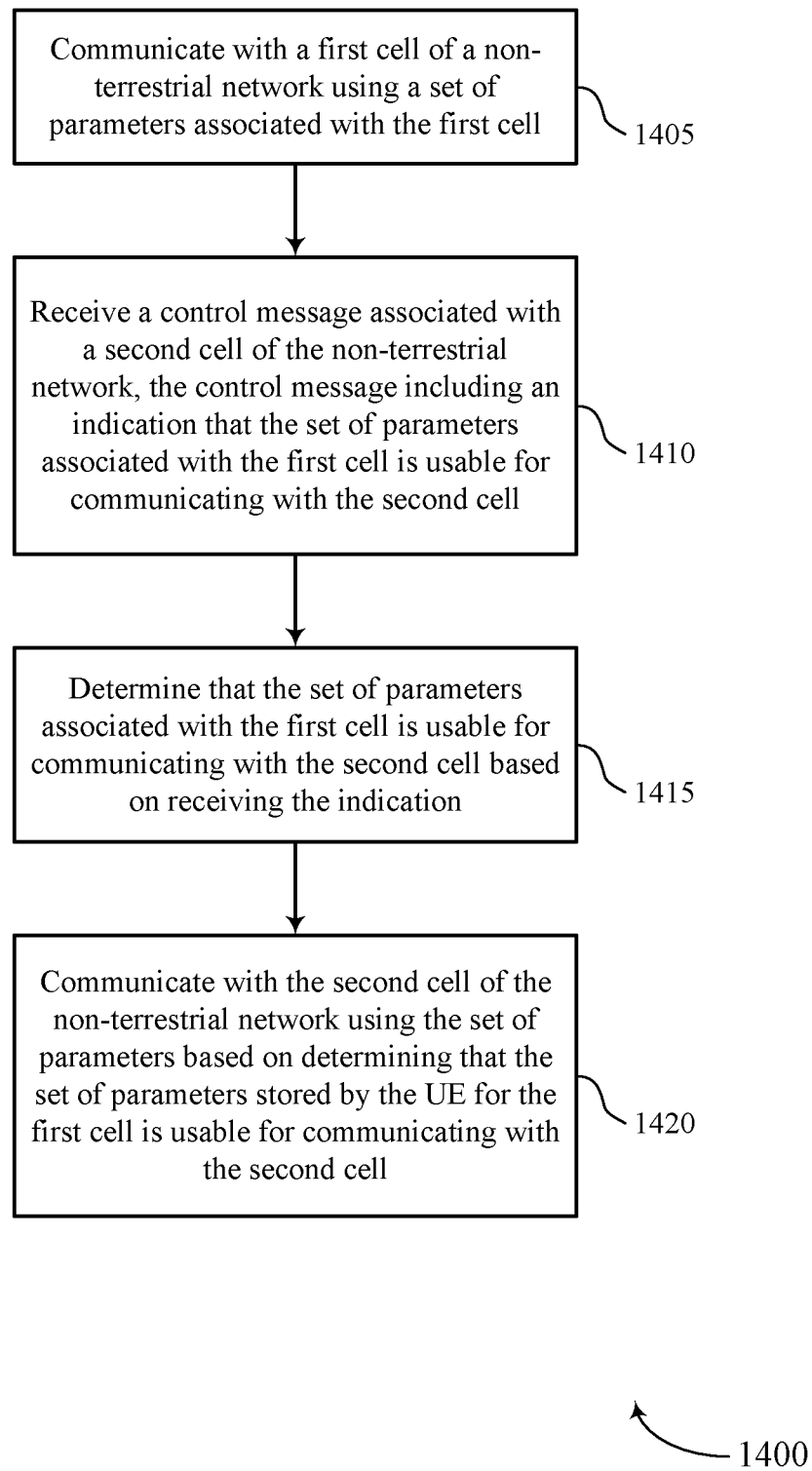
FIGS. 14 through 17 show flowcharts illustrating methods that support SIB acquisition for wireless networks in accordance with aspects of the present disclosure.

FIG. 14 shows a flowchart illustrating a method 1400 that supports SIB acquisition for wireless networks in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may communicate with a first cell of an NTN using a set of parameters associated with the first cell. The operations of 1405 may be performed according to the methods described herein. In some examples, aspects of the operations of 1405 may be performed by an NTN communications manager as described with reference to FIGS. 6 through 9.

At 1410, the UE may receive a control message associated with a second cell of the NTN, the control message including an indication that the set of parameters associated with the first cell is usable for communicating with the second cell. The operations of 1410 may be performed according to the methods described herein. In some examples, aspects of the operations of 1410 may be performed by a control message receiving manager as described with reference to FIGS. 6 through 9.

At 1415, the UE may determine that the set of parameters associated with the first cell is usable for communicating with the second cell based on receiving the indication. The operations of 1415 may be performed according to the methods described herein. In some examples, aspects of the operations of 1415 may be performed by a cell parameter manager as described with reference to FIGS. 6 through 9.

At 1420, the UE may communicate with the second cell of the NTN using the set of parameters based on determining that the set of parameters stored by the UE for the first cell is usable for communicating with the second cell. The operations of 1420 may be performed according to the methods described herein. In some examples, aspects of the operations of 1420 may be performed by an NTN communications manager as described with reference to FIGS. 6 through 9.

Figure 15:
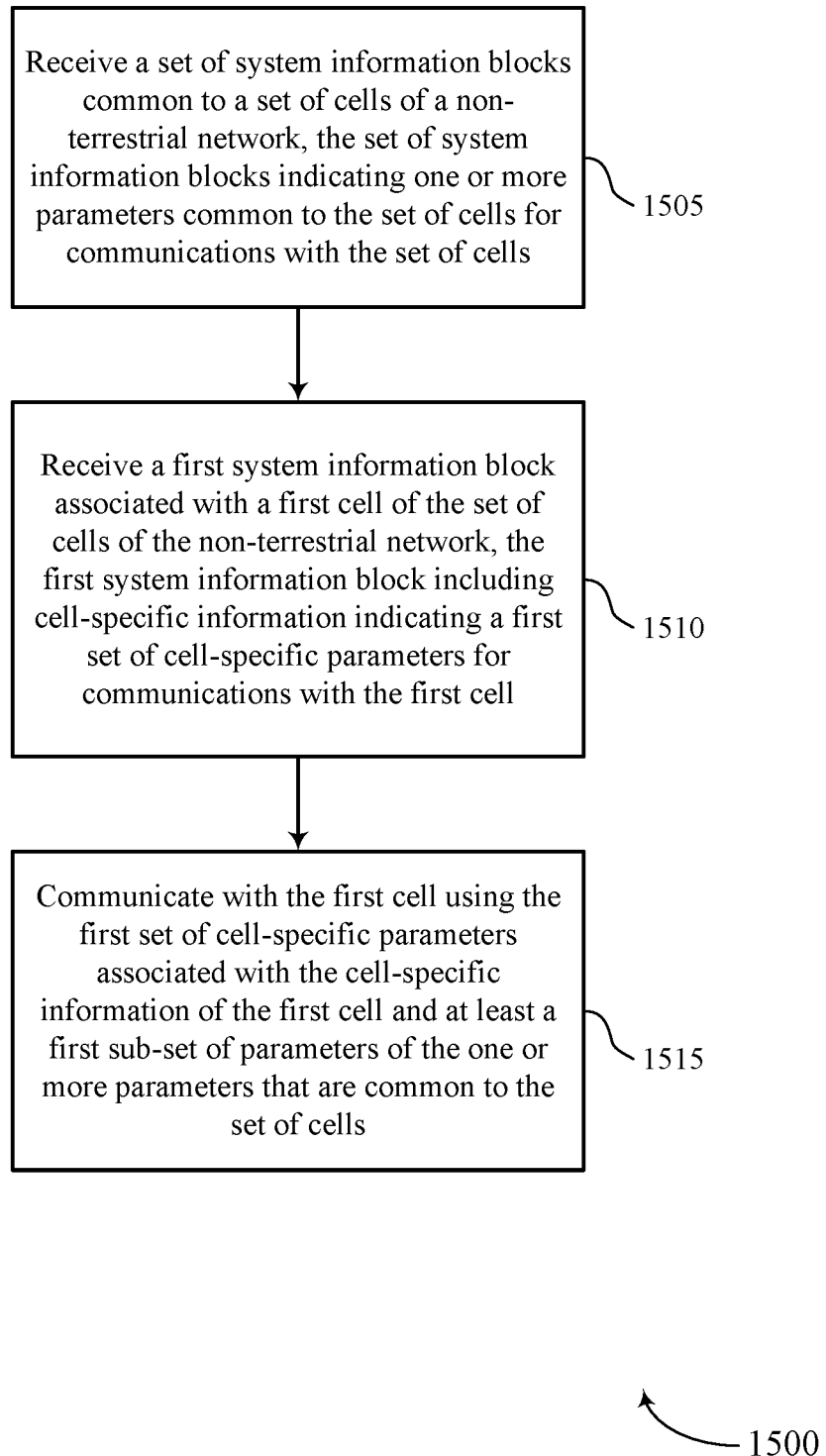

FIG. 15 shows a flowchart illustrating a method 1500 that supports SIB acquisition for wireless networks in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a set of SIBs common to a set of cells of an NTN, the set of SIBs indicating one or more parameters common to the set of cells for communications with the set of cells. The operations of 1505 may be performed according to the methods described herein. In some examples, aspects of the operations of 1505 may be performed by a SIB receiving manager as described with reference to FIGS. 6 through 9.

At 1510, the UE may receive a first SIB associated with a first cell of the set of cells of the NTN, the first SIB including cell-specific information indicating a first set of cell-specific parameters for communications with the first cell. The operations of 1510 may be performed according to the methods described herein. In some examples, aspects of the operations of 1510 may be performed by a SIB receiving manager as described with reference to FIGS. 6 through 9.

At 1515, the UE may communicate with the first cell using the first set of cell-specific parameters associated with the cell-specific information of the first cell and at least a first sub-set of parameters of the one or more parameters that are common to the set of cells. The operations of 1515 may be performed according to the methods described herein. In some examples, aspects of the operations of 1515 may be performed by an NTN communications manager as described with reference to FIGS. 6 through 9.

Figure 16:
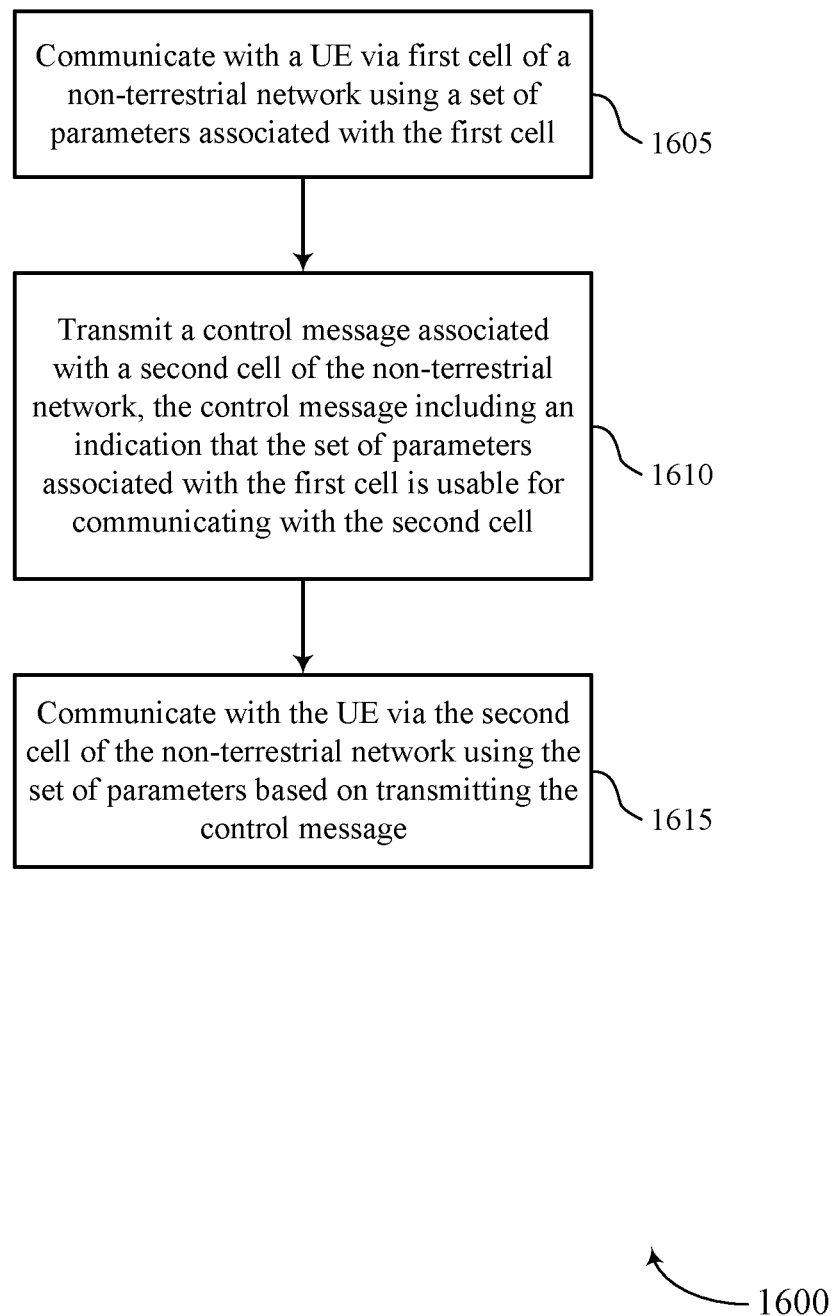

FIG. 16 shows a flowchart illustrating a method 1600 that supports SIB acquisition for wireless networks in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may communicate with a UE via first cell of an NTN using a set of parameters associated with the first cell. The operations of 1605 may be performed according to the methods described herein. In some examples, aspects of the operations of 1605 may be performed by an NTN communications manager as described with reference to FIGS. 10 through 13.

At 1610, the base station may transmit a control message associated with a second cell of the NTN, the control message including an indication that the set of parameters associated with the first cell is usable for communicating with the second cell. The operations of 1610 may be performed according to the methods described herein. In some examples, aspects of the operations of 1610 may be performed by a control message transmitting manager as described with reference to FIGS. 10 through 13.

At 1615, the base station may communicate with the UE via the second cell of the NTN using the set of parameters based on transmitting the control message. The operations of 1615 may be performed according to the methods described herein. In some examples, aspects of the operations of 1615 may be performed by an NTN communications manager as described with reference to FIGS. 10 through 13.

Figure 17:
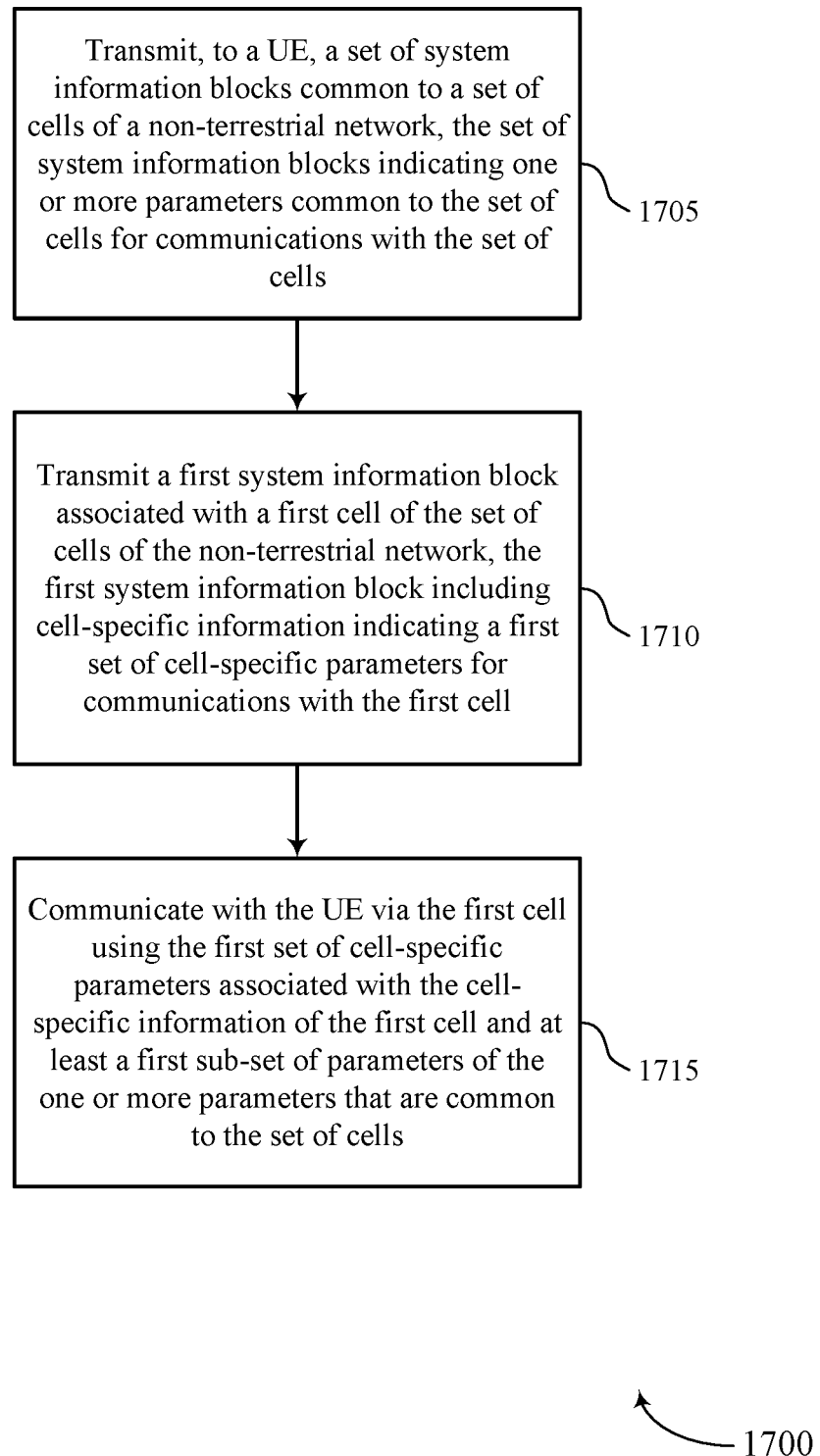

FIG. 17 shows a flowchart illustrating a method 1700 that supports SIB acquisition for wireless networks in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a set of SIBs common to a set of cells of an NTN, the set of SIBs indicating one or more parameters common to the set of cells for communications with the set of cells. The operations of 1705 may be performed according to the methods described herein. In some examples, aspects of the operations of 1705 may be performed by a SIB transmitting manager as described with reference to FIGS. 10 through 13.

At 1710, the base station may transmit a first SIB associated with a first cell of the set of cells of the NTN, the first SIB including cell-specific information indicating a first set of cell-specific parameters for communications with the first cell. The operations of 1710 may be performed according to the methods described herein. In some examples, aspects of the operations of 1710 may be performed by a SIB transmitting manager as described with reference to FIGS. 10 through 13.

At 1715, the base station may communicate with the UE via the first cell using the first set of cell-specific parameters associated with the cell-specific information of the first cell and at least a first sub-set of parameters of the one or more parameters that are common to the set of cells. The operations of 1715 may be performed according to the methods described herein. In some examples, aspects of the operations of 1715 may be performed by an NTN communications manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a set of SIBs common to a set of cells of an NTN, the set of SIBs indicating one or more parameters common to the set of cells for communications with the set of cells; receiving a first SIB associated with a first cell of the set of cells of the NTN, the first SIB comprising cell-specific information indicating a first set of cell-specific parameters for communications with the first cell; and communicating with the first cell using the first set of cell-specific parameters associated with the cell-specific information of the first cell and at least a first sub-set of parameters of the one or more parameters that are common to the set of cells.

Aspect 2: The method of aspect 1, further comprising: identifying a cell-specific parameter of the first set of cell-specific parameters that is different than a common parameter indicated by the set of SIBs common to the set of cells, the cell-specific information included in the first SIB indicating the cell-specific parameter, wherein communicating with the first cell is based at least in part on identifying the cell-specific parameter.

Aspect 3: The method of any of aspects 1 through 2, further comprising: identifying a difference between a common parameter indicated by the set of SIBs common to the set of cells and a cell-specific parameter of the first set of cell-specific parameters, an additional common parameter associated with the first cell, or both, the cell-specific information included in the first SIB of the first cell indicating the difference, wherein communicating with the first cell is based at least in part on identifying the difference.

Aspect 4: The method of any of aspects 1 through 3, further comprising: communicating with a second cell using the one or more parameters indicated by the set of SIBs that are common to the set of cells.

Aspect 5: The method of any of aspects 1 through 4, further comprising: identifying the set of SIBs are common to the set of cells based at least in part on a geographic coverage area, a tracking area, or both.

Aspect 6: The method of any of aspects 1 through 5, further comprising: receiving a set of non-terrestrial-network-specific parameters, a set of satellite-specific parameters, or both, based at least in part on a configured periodicity, or based at least in part on receiving an indication to acquire the set of non-terrestrial-network-specific parameters, the set of satellite-specific parameters, or both.

Aspect 7: The method of any of aspects 1 through 6, further comprising: refraining from receiving a set of non-terrestrial-network-specific parameters, a set of satellite-specific parameters, or both, based at least in part on receiving indication of a change in the first set of cell-specific parameters or a change in the one or more parameters that are common to the set of cells.

Aspect 8: The method of any of aspects 1 through 7, further comprising: receiving a configuration message including an indication of a set of downlink resources for receiving SIBs that include the cell-specific information, wherein receiving the first SIB for the first cell is based at least in part on receiving the configuration message.

Aspect 9: The method of any of aspects 1 through 8, further comprising: receiving, from the first cell, a downlink message including an indication of a change in at least one cell-specific parameter of the first set of cell-specific parameters associated with the first cell or at least one parameter of the one or more parameters that are common to the set of cells; updating the first SIB associated with the first cell based at least in part on receiving the downlink message; and communicating with the first cell based at least in part on updating the first SIB.

Aspect 10: The method of any of aspects 1 through 9, further comprising: receiving a second SIB associated with a second cell of the set of cells of the NTN, the second SIB comprising second cell-specific information indicating a second set of cell-specific parameters for communications with the second cell; and communicating with the second cell using the second set of cell-specific parameters associated with the cell-specific information of the first cell and at least a second sub-set of parameters of the one or more parameters that are common to the set of cells.

Aspect 11: The method of any of aspects 1 through 10, further comprising: receiving an indication of a neighbor cell list associated with the first cell based at least in part on receiving the first SIB from the first cell.

Aspect 12: The method of aspect 11, further comprising: receiving an indication of a periodicity, a next update time, or both, associated with an additional SIB associated with at least one cell of the neighbor cell list based at least in part on receiving the first SIB.

Aspect 13: The method of any of aspects 1 through 12, further comprising: identifying that an update to the first set of cell-specific parameters associated with the first cell is available; determining that an expected duration until initiating a cell reselection procedure with a second cell satisfies a threshold; refraining from updating the first set of cell-specific parameters based at least in part on determining that the expected duration satisfies the threshold; and performing the cell reselection procedure with the second cell based at least in part on determining that the expected duration satisfies the threshold.

Aspect 14: The method of aspect 13, further comprising: receiving the update to the first set of cell-specific parameters associated with the first cell after performing the cell reselection procedure.

Aspect 15: The method of any of aspects 1 through 14, further comprising: identifying that an update to the first set of cell-specific parameters associated with the first cell is available; refraining from performing an attachment procedure with the first cell based at least in part on identifying that the update to the first set of cell-specific parameters for the first cell is available; and performing an attachment procedure after receiving the update to the first set of cell-specific parameters associated with the first cell based at least in part on identifying that the update to the first set of cell-specific parameters for the first cell is available.

Aspect 16: The method of any of aspects 1 through 15, wherein the one or more parameters common to the set of cells are used by each cell of the NTN associated with a satellite of the NTN.

Aspect 17: The method of any of aspects 1 through 16, wherein the one or more parameters common to the set of cells are used by a sub-set of cells of the NTN associated with a satellite of the NTN.

Aspect 18: A method for wireless communications at a UE, comprising: communicating with a first cell of an NTN using a set of parameters associated with the first cell; receiving a control message associated with a second cell of the NTN, the control message comprising an indication that the set of parameters associated with the first cell is usable for communicating with the second cell; determining that the set of parameters associated with the first cell is usable for communicating with the second cell based at least in part on receiving the indication; and communicating with the second cell of the NTN using the set of parameters based at least in part on determining that the set of parameters stored by the UE for the first cell is usable for communicating with the second cell.

Aspect 19: The method of aspect 18, further comprising: receiving a second indication of a validity period associated with the set of parameters, wherein determining that the set of parameters stored by the UE for the first cell is usable for communicating with the second cell is based at least in part on the validity period.

Aspect 20: The method of any of aspects 18 through 19, further comprising: receiving a second control message associated with a third cell of the NTN; and selecting to communicate with the second cell based at least in part on the set of parameters stored by the UE being associated with the second cell and not the third cell, wherein communicating with the second cell is based at least in part on selecting to communicate with the second cell.

Aspect 21: The method of any of aspects 18 through 20, further comprising: receiving a RRC message or a non-access stratum message comprising one or more sets of SIBs associated with a set of cells of the NTN based at least in part on a predicted path of the UE relative to the NTN, wherein the set of cells comprises the first cell and the second cell, wherein communicating with the first cell is based at least in part on receiving the RRC message or the non-access stratum message.

Aspect 22: The method of any of aspects 18 through 21, wherein determining that the set of parameters stored by the UE for the first cell is usable for communicating with the second cell comprises: determining that the set of parameters are unchanged during a validity period based at least in part on receiving the indication.

Aspect 23: The method of any of aspects 18 through 22, further comprising: determining that the set of parameters stored by the UE for the first cell is not usable for communicating with a third cell of the NTN; receiving one or more SIBs associated with the third cell based at least in part on determining that the set of parameters stored by the UE for the first cell is not usable for communicating with the third cell; and communicating with the third cell based at least in part on receiving the one or more SIBs.

Aspect 24: The method of any of aspects 18 through 23, further comprising: receiving one or more SIBs associated with the first cell that comprise the set of parameters for communicating with the first cell of the NTN, wherein communicating with the first cell is based at least in part on receiving the one or more SIBs; and determining that the first cell belongs to a set of cells based at least in part on a second indication of a set of physical cell identifiers associated with the set of parameters.

Aspect 25: The method of any of aspects 18 through 24, further comprising: receiving a downlink message comprising a neighbor cell list associated with the first cell and one or more parameters associated with at least one cell of the neighbor cell list, wherein communicating with the first cell is based at least in part on receiving the downlink message.

Aspect 26: The method of aspect 25, further comprising: selecting the second cell as part of an intra-frequency cell reselection procedure or an inter-frequency cell reselection procedure with the second cell, wherein communicating with the second cell is based at least in part on selecting the second cell; and refraining from updating the neighbor cell list associated with the second cell based at least in part on selecting the second cell as part of the intra-frequency cell reselection procedure or the inter-frequency cell reselection procedure.

Aspect 27: The method of any of aspects 25 through 26, further comprising: selecting the second cell as part of an intra-frequency cell reselection procedure with the second cell, wherein communicating with the second cell is based at least in part on selecting the second cell; and updating the neighbor cell list associated with the second cell based at least in part on selecting the second cell as part of the intra-frequency cell reselection procedure.

Aspect 28: The method of any of aspects 25 through 27, further comprising: selecting the second cell as part of an inter-frequency cell reselection procedure with the second cell, wherein communicating with the second cell is based at least in part on selecting the second cell; and updating the neighbor cell list associated with the second cell based at least in part on selecting the second cell as part of the inter-frequency cell reselection procedure.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a UE, comprising a processor; memory coupled with the processor; and instructions stored in the memory and executable by the processor to cause the apparatus to perform a method of any of aspects 18 through 28.

Aspect 33: An apparatus for wireless communications at a UE, comprising at least one means for performing a method of any of aspects 18 through 28.

Aspect 34: A non-transitory computer-readable medium storing code for wireless communications at a UE, the code comprising instructions executable by a processor to perform a method of any of aspects 18 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a set of system information blocks common to a set of cells of a non-terrestrial network, the set of system information blocks indicating one or more parameters common to the set of cells for communications with the set of cells;
   receiving a first system information block associated with a first cell of the set of cells of the non-terrestrial network, the first system information block comprising cell-specific information indicating a first set of cell-specific parameters for communications with the first cell; and
   communicating with the first cell using the first set of cell-specific parameters associated with the cell-specific information of the first cell and at least a first sub-set of parameters of the one or more parameters that are common to the set of cells.

2. The method of claim 1, further comprising:
   identifying a cell-specific parameter of the first set of cell-specific parameters that is different than a common parameter indicated by the set of system information blocks common to the set of cells, the cell-specific information included in the first system information block indicating the cell-specific parameter, wherein communicating with the first cell is based at least in part on identifying the cell-specific parameter.

3. The method of claim 1, further comprising:
   identifying a difference between a common parameter indicated by the set of system information blocks common to the set of cells and a cell-specific parameter of the first set of cell-specific parameters, an additional common parameter associated with the first cell, or both, the cell-specific information included in the first system information block of the first cell indicating the difference, wherein communicating with the first cell is based at least in part on identifying the difference.

4. The method of claim 1, further comprising:
   communicating with a second cell using the one or more parameters indicated by the set of system information blocks that are common to the set of cells.

5. The method of claim 1, further comprising:
   identifying the set of system information blocks are common to the set of cells based at least in part on a geographic coverage area, a tracking area, or both.

6. The method of claim 1, further comprising:
   receiving a set of non-terrestrial-network-specific parameters, a set of satellite-specific parameters, or both, based at least in part on a configured periodicity, or based at least in part on receiving an indication to acquire the set of non-terrestrial-network-specific parameters, the set of satellite-specific parameters, or both.

7. The method of claim 1, further comprising:
   refraining from receiving a set of non-terrestrial-network-specific parameters, a set of satellite-specific parameters, or both, based at least in part on receiving indication of a change in the first set of cell-specific parameters or a change in the one or more parameters that are common to the set of cells.

8. The method of claim 1, further comprising:
   receiving a configuration message including an indication of a set of downlink resources for receiving system information blocks that include the cell-specific information, wherein receiving the first system information block for the first cell is based at least in part on receiving the configuration message.

9. The method of claim 1, further comprising:
   receiving, from the first cell, a downlink message including an indication of a change in at least one cell-specific parameter of the first set of cell-specific parameters associated with the first cell or at least one parameter of the one or more parameters that are common to the set of cells;
   updating the first system information block associated with the first cell based at least in part on receiving the downlink message; and
   communicating with the first cell based at least in part on updating the first system information block.

10. The method of claim 1, further comprising:
    receiving a second system information block associated with a second cell of the set of cells of the non-terrestrial network, the second system information block comprising second cell-specific information indicating a second set of cell-specific parameters for communications with the second cell; and
    communicating with the second cell using the second set of cell-specific parameters associated with the cell-specific information of the first cell and at least a second sub-set of parameters of the one or more parameters that are common to the set of cells.

11. The method of claim 1, further comprising:
    receiving an indication of a neighbor cell list associated with the first cell based at least in part on receiving the first system information block from the first cell.

12. The method of claim 11, further comprising:
    receiving an indication of a periodicity, a next update time, or both, associated with an additional system information block associated with at least one cell of the neighbor cell list based at least in part on receiving the first system information block.

13. The method of claim 1, further comprising:
    identifying that an update to the first set of cell-specific parameters associated with the first cell is available;
    determining that an expected duration until initiating a cell reselection procedure with a second cell satisfies a threshold;
    refraining from updating the first set of cell-specific parameters based at least in part on determining that the expected duration satisfies the threshold; and
    performing the cell reselection procedure with the second cell based at least in part on determining that the expected duration satisfies the threshold.

14. The method of claim 13, further comprising:
    receiving the update to the first set of cell-specific parameters associated with the first cell after performing the cell reselection procedure.

15. The method of claim 1, further comprising:
    identifying that an update to the first set of cell-specific parameters associated with the first cell is available;

refraining from performing an attachment procedure with the first cell based at least in part on identifying that the update to the first set of cell-specific parameters for the first cell is available; and performing an attachment procedure after receiving the update to the first set of cell-specific parameters associated with the first cell based at least in part on identifying that the update to the first set of cell-specific parameters for the first cell is available.

16. The method of claim 1, wherein the one or more parameters common to the set of cells are used by each cell of the non-terrestrial network associated with a satellite of the non-terrestrial network.

17. The method of claim 1, wherein the one or more parameters common to the set of cells are used by a sub-set of cells of the non-terrestrial network associated with a satellite of the non-terrestrial network.

18. A method for wireless communications at a user equipment (UE), comprising:

communicating with a first cell of a non-terrestrial network using a set of parameters associated with the first cell;

receiving a control message associated with a second cell of the non-terrestrial network, the control message comprising an indication that the set of parameters associated with the first cell is usable for communicating with the second cell;

determining that the set of parameters associated with the first cell is usable for communicating with the second cell based at least in part on receiving the indication; and communicating with the second cell of the non-terrestrial network using the set of parameters based at least in part on determining that the set of parameters stored by the UE for the first cell is usable for communicating with the second cell.

19. The method of claim 18, further comprising:

receiving a second indication of a validity period associated with the set of parameters, wherein determining that the set of parameters stored by the UE for the first cell is usable for communicating with the second cell is based at least in part on the validity period.

20. The method of claim 18, further comprising:
receiving a second control message associated with a third cell of the non-terrestrial network; and
selecting to communicate with the second cell based at least in part on the set of parameters stored by the UE being associated with the second cell and not the third cell, wherein communicating with the second cell is based at least in part on selecting to communicate with the second cell.

21. The method of claim 18, further comprising:
receiving a radio resource control message or a non-access stratum message comprising one or more sets of system information blocks associated with a set of cells of the non-terrestrial network based at least in part on a predicted path of the UE relative to the non-terrestrial network, wherein the set of cells comprises the first cell and the second cell, wherein communicating with the first cell is based at least in part on receiving the radio resource control message or the non-access stratum message.

22. The method of claim 18, wherein determining that the set of parameters stored by the UE for the first cell is usable for communicating with the second cell comprises:

determining that the set of parameters are unchanged during a validity period based at least in part on receiving the indication.

23. The method of claim 18, further comprising:
determining that the set of parameters stored by the UE for the first cell is not usable for communicating with a third cell of the non-terrestrial network;
receiving one or more system information blocks associated with the third cell based at least in part on determining that the set of parameters stored by the UE for the first cell is not usable for communicating with the third cell; and
communicating with the third cell based at least in part on receiving the one or more system information blocks.

24. The method of claim 18, further comprising:
receiving one or more system information blocks associated with the first cell that comprise the set of parameters for communicating with the first cell of the non-terrestrial network, wherein communicating with the first cell is based at least in part on receiving the one or more system information blocks; and
determining that the first cell belongs to a set of cells based at least in part on a second indication of a set of physical cell identifiers associated with the set of parameters.

25. The method of claim 18, further comprising:
receiving a downlink message comprising a neighbor cell list associated with the first cell and one or more parameters associated with at least one cell of the neighbor cell list, wherein communicating with the first cell is based at least in part on receiving the downlink message.

26. The method of claim 25, further comprising:
selecting the second cell as part of an intra-frequency cell reselection procedure or an inter-frequency cell reselection procedure with the second cell, wherein communicating with the second cell is based at least in part on selecting the second cell; and
refraining from updating the neighbor cell list associated with the second cell based at least in part on selecting the second cell as part of the intra-frequency cell reselection procedure or the inter-frequency cell reselection procedure.

27. The method of claim 25, further comprising:
selecting the second cell as part of an intra-frequency cell reselection procedure with the second cell, wherein communicating with the second cell is based at least in part on selecting the second cell; and
updating the neighbor cell list associated with the second cell based at least in part on selecting the second cell as part of the intra-frequency cell reselection procedure.

28. The method of claim 25, further comprising:
selecting the second cell as part of an inter-frequency cell reselection procedure with the second cell, wherein communicating with the second cell is based at least in part on selecting the second cell; and
updating the neighbor cell list associated with the second cell based at least in part on selecting the second cell as part of the inter-frequency cell reselection procedure.

29. An apparatus for wireless communications at a user equipment (UE), comprising:
a processor, memory coupled with the processor; and
instructions stored in the memory and executable by the processor to cause the apparatus to:
receive a set of system information blocks common to a set of cells of a non-terrestrial network, the set of system information blocks indicating one or more parameters common to the set of cells for communications with the set of cells;

receive a first system information block associated with a first cell of the set of cells of the non-terrestrial network, the first system information block comprising cell-specific information indicating a first set of cell-specific parameters for communications with the first cell; and communicate with the first cell using the first set of cell-specific parameters associated with the cell-specific information of the first cell and at least a first sub-set of parameters of the one or more parameters that are common to the set of cells.

30. An apparatus for wireless communications at a user equipment (UE), comprising:

a processor, memory coupled with the processor; and instructions stored in the memory and executable by the processor to cause the apparatus to:

communicate with a first cell of a non-terrestrial network using a set of parameters associated with the first cell;

receive a control message associated with a second cell of the non-terrestrial network, the control message comprising an indication that the set of parameters associated with the first cell is usable for communicating with the second cell;

determine that the set of parameters associated with the first cell is usable for communicating with the second cell based at least in part on receiving the indication; and communicate with the second cell of the non-terrestrial network using the set of parameters based at least in part on determining that the set of parameters stored by the apparatus UE for the first cell is usable for communicating with the second cell.

* * * * *